(12) United States Patent
Seok

(10) Patent No.: US 12,379,849 B2
(45) Date of Patent: Aug. 5, 2025

(54) APPARATUS AND METHOD FOR SHARING DATA BETWEEN A HOST AND A MEMORY SYSTEM BASED ON DATA CHARACTERISTICS

(71) Applicant: SK hynix Inc., Icheon-si (KR)

(72) Inventor: Ji Hoon Seok, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 87 days.

(21) Appl. No.: 18/166,591

(22) Filed: Feb. 9, 2023

(65) Prior Publication Data

US 2024/0118809 A1 Apr. 11, 2024

(30) Foreign Application Priority Data

Oct. 7, 2022 (KR) .......................... 10-2022-0128502

(51) Int. Cl.
*G06F 3/06* (2006.01)
*G06F 12/02* (2006.01)

(52) U.S. Cl.
CPC .......... *G06F 3/0613* (2013.01); *G06F 3/0659* (2013.01); *G06F 3/0673* (2013.01); *G06F 12/0253* (2013.01)

(58) Field of Classification Search
CPC .... G06F 3/0613; G06F 3/0659; G06F 3/0673; G06F 12/0253; G06F 16/10; G06F 3/0647; G06F 3/0679; G06F 2212/7201; G06F 2212/7205; G06F 12/0246
See application file for complete search history.

(56) References Cited

U.S. PATENT DOCUMENTS

| | | | |
|---|---|---|---|
| 10,042,853 B2 | 8/2018 | Sundaram et al. | |
| 11,169,744 B2 | 11/2021 | Brief et al. | |
| 11,366,611 B2 * | 6/2022 | Byun | G06F 3/0679 |
| 2020/0159672 A1 * | 5/2020 | Byun | G06F 3/0659 |
| 2021/0334209 A1 | 10/2021 | Ke et al. | |
| 2022/0012174 A1 * | 1/2022 | Seok | G06F 3/061 |
| 2022/0188246 A1 * | 6/2022 | Gyllenskog | G06F 13/1668 |
| 2023/0367706 A1 * | 11/2023 | Zhao | G06F 12/0246 |
| 2023/0376247 A1 * | 11/2023 | Lee | G06F 11/1048 |

* cited by examiner

*Primary Examiner* — Tasnima Matin

(57) ABSTRACT

A memory system includes a memory device and a controller. The memory device includes a plurality of memory cells. The controller is configured to select first map data entries associated with first data entries stored in a first region of the memory device that includes some of the plurality of memory cells, to exclude a second map data entry associated with second data entry sequentially read from among the first map data entries, and to transmit a remaining first map data entry to an external device.

20 Claims, 11 Drawing Sheets

APPARATUS AND METHOD FOR SHARING DATA BETWEEN A HOST AND A MEMORY SYSTEM BASED ON DATA CHARACTERISTICS

CROSS-REFERENCE TO RELATED APPLICATIONS

This patent application claims to the benefit of priority under 35 U.S.C. § 119(a) to Korean Patent Application No. 10-2022-0128502, filed on Oct. 7, 2022 in the Korean Intellectual Property Office, the entire disclosure of which is incorporated herein by reference.

TECHNICAL FIELD

One or more embodiments described in this disclosure relate to a memory system, and specifically, to an apparatus and a method for sharing data between the memory system and a host.

BACKGROUND

A data processing system includes a memory system or a data storage device. The data processing system can be developed to store more voluminous data in the data storage device, to store data in the data storage device faster, and to read data stored in the data storage device faster. The memory system or the data storage device can include non-volatile memory cells and/or volatile memory cells for storing data.

BRIEF DESCRIPTION OF THE DRAWINGS

The description herein references the accompanying drawings where like reference numerals refer to like parts throughout the figures.

DETAILED DESCRIPTION

Figure 1:
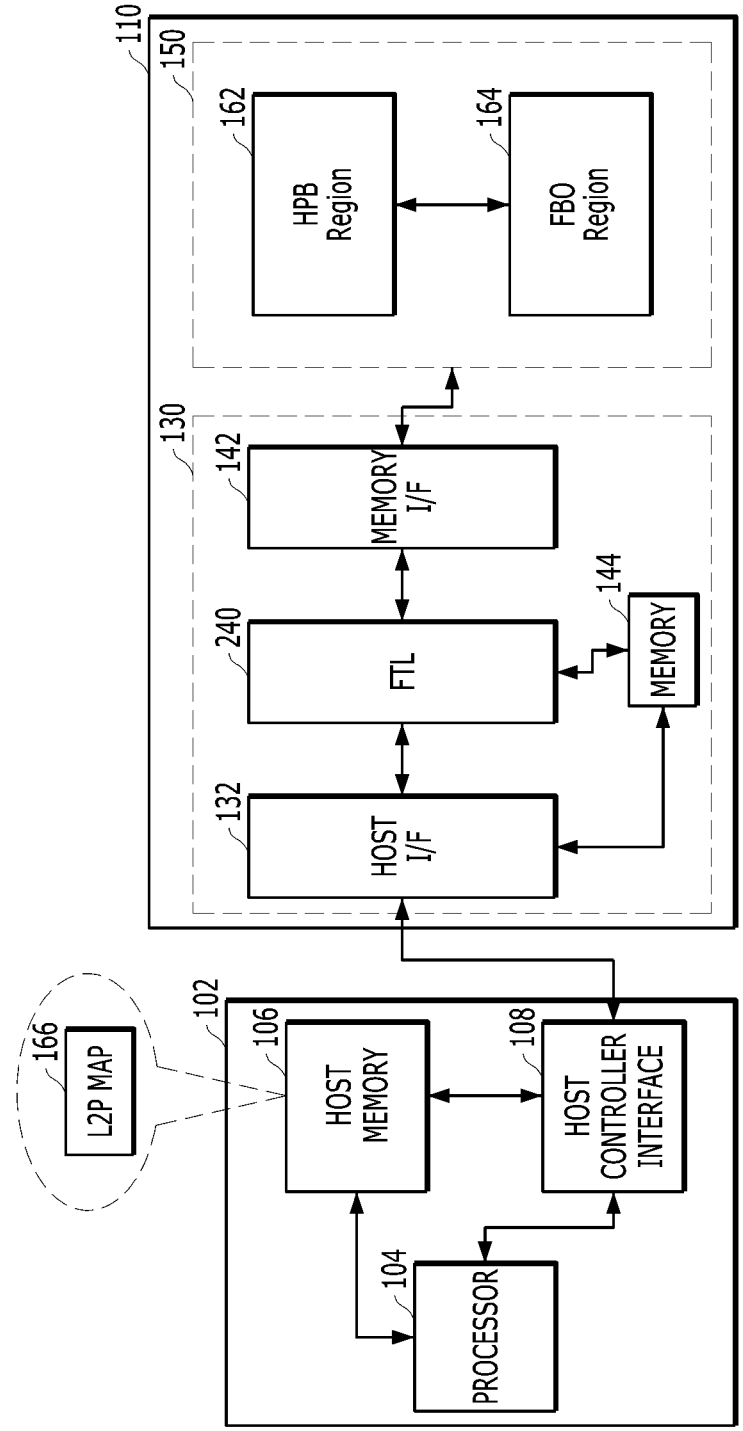
FIG. 1 illustrates a data processing system according to an embodiment of the disclosure.

Various embodiments of the disclosed technology are described with reference to the accompanying drawings. Elements and features of the disclosed technology, however, may be configured or arranged differently to form other embodiments, which may be variations of any of the disclosed embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

In this disclosure, the terms "comprise," "comprising," "include" and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

In implementations of the disclosed disclosure, the term 'circuitry' refers to at least one of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); or (c) to circuits, such as a microprocessor(s) or a portion of a microprocessor(s), that require software or firmware for operation, even if the software or firmware is not physically present. This definition of 'circuitry' applies to all uses of this term in this application, including in any claims. In implementations, the term "circuitry" also covers an implementation of merely a processor (or multiple processors) or portion of a processor and its (or their) accompanying software and/or firmware. The term "circuitry" also covers, for example, an integrated circuit for a storage device.

As used herein, these terms are used as labels for nouns that they precede, and do not imply any type of ordering (e.g., spatial, temporal, logical, etc.). The terms "first" and "second" do not necessarily imply that the first value must be written before the second value. Further, although the terms "first", "second", "third", and so on may be used herein to identify various elements, these elements are not limited by these terms. These terms are used to distinguish one element from another element that otherwise have the same or similar names. For example, a first circuitry may be distinguished from a second circuitry.

Herein, an entry of data or a data entry may be a sequence of bits. For example, the data entry may include the contents of a file, a portion of the file, a page in memory, an object in an object-oriented program, a digital message, a digital scanned image, a part of a video or audio signal, or any other entity that can be represented by a sequence of bits. According to an embodiment, the data entry may include a discrete object. According to another embodiment, the data entry may include a unit of information within a transmission packet between two different components.

Also, the term "based on" may describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose determination of A from also being based on C. In other instances, A may be determined based solely on B.

An embodiment described in this disclosure can provide a data processing system and a method for operating the data processing system. The data processing system can include components and resources such as a memory system and a host. The data processing system can include an apparatus for improving data input/output operation performance between the components based on usages of the components and the resources.

An implementation of the disclosed disclosure can provide a method and an apparatus for making a memory system, included in a data processing system, transmit a map data entry to a host or a computing device, or making the host or the computing device to transmit a command along with the map data entry to the memory system, to improve operational performance of the memory system or the data processing system.

An implementation of the disclosed disclosure can provide an apparatus and a method for improving data read performance of a memory system by determining which map data entry the memory system transmits to the host or the computing device included in the data processing system before transmitting the map data entry based on a host performance boost (HPB) region and/or a file-based optimization (FBO).

According to an embodiment of the disclosure, a memory system can include a memory device including a plurality of memory cells; and a controller configured to select first map data entries associated with first data entries stored in a first region of the memory device that includes some of the plurality of memory cells, to exclude a second map data entry associated with second data entry, sequentially read from among the first map data entries, and to transmit a remaining first map data entry to an external device.

The controller can be further configured to add a third region into the first region, and to transmit a third map data entry, which is associated with a third data entry stored in the third region, to the external device.

A logical address range regarding map data entries transmitted by the controller can be determined based on a file system used by the external device.

The controller can be configured to, in response to a request input from the external device, migrate some of the first data entries in the first region to a contiguously allocated location in another region.

The controller can be configured to invalidate a previously transmitted map data entry associated with the some of the first data entries migrated to the contiguously allocated location.

The controller can be further configured to determine a first logical address range based on an access pattern regarding the memory device in an idle state when there is no request input from the external device, to establish a contiguously allocated location corresponding to memory cells storing data entries associated with the first logical address range, and to migrate the data entries to the contiguously allocated location in the memory device.

The controller can be further configured to sort the data entries associated with the first logical address range for sequential read operations during garbage collection while performing a garbage collection operation for the memory device.

The controller can be further configured to transmit, to the external device, a notice indicating that a previously transmitted map data entry associated with the first logical address range become invalid, after sorting the data entries for the sequential read operation.

The controller can be configured to determine the first region based on a size of map data entries transmitted to the external device.

In another embodiment, a method can be provided for operating a memory system including a memory device, the memory device including memory blocks including a plurality of memory cells. The method can include selecting first map data entries associated with first data entries stored in a host performance booster (HPB) region including some of the plurality of memory cells; excluding a second map data entry associated with second data entry sequentially read among the first map data entries regarding the HPB region; and transmitting a remaining first map data entry to a host.

The method can further include performing a file-based optimization (FBO) operation for at least some of the HPB region in the memory device; and invalidating some of the first map data entries corresponding to the at least some of the HPB region.

The method can further include adding a region irrelevant to the FBO operation to the HPB region; and transmitting at least one map data entry corresponding to an added region to the host.

The FBO operation can be performed for a first logical address range determined based on a file system used by the external device.

The performing the FBO operation can include establishing, in response to a request input from the external device, a file-based optimization (FBO) region including memory cells contiguously allocated for storing data entries associated with the first logical address range; and migrating the data entries associated with the first logical address range to the FBO region.

The performing the FBO operation can include determining the first logical address range based on an access regarding the memory device in an idle state when there is no request input from the host; establishing a file-based optimization (FBO) region including memory cells contiguously allocated for storing data entries associated with the first logical address range; and migrating the data entries associated with the first logical address range to the FBO region.

The method can further include checking a blank region capable of storing data entries associated with the first logical address range.

The method can further include performing the FBO operation along with garbage collection for the memory device.

In another embodiment, a controller can be coupled to a memory including a plurality of regions, each region including a plurality of memory cells. The controller can include at least one processor, at least one memory, and logic in which at least a portion of the logic is comprised in hardware and executed by the at least one processor to: program a data entry input from an external device in a first region among the plural regions; migrate the data entry from the first region to either a second region or a third region from among the plurality of regions based on an attribute of the data entry; transmitting a map data entry associated with the data entry stored in the second region to an external device; and performing a sequential read operation in the data entry stored in the third region, in response to a read request input from the external device.

The first region can include a single-level cell (SLC) buffer, while the second region and the third region can include a multi-level cell (MLC) block.

The logic can be configured to perform data migration for data entries from the first region to the third region, and the data entries determined based on a file system used by the external device.

Embodiments of the disclosed technology will now be described with reference to the accompanying drawings, wherein like numbers reference like elements.

FIG. 1 illustrates a data processing system according to an embodiment of the disclosure. Specifically, in the data processing system shown in FIG. 1, an example of using a host memory 106 included in a host 102 will be described as a device or an apparatus capable of temporarily storing metadata or a map data entry, which is used in a memory system 110 in communication with a host 102.

Referring to FIG. 1, the host 102 may include a processor 104, the host memory 106, and a host controller interface 108. The memory system 110 may include a controller 130 and a memory device 150. The controller 130 and memory device 150 of FIG. 1 may correspond to a controller 130 and a memory device 150 of FIGS. 2 to 3.

The processor 104 may have higher performance than that of the memory system 110, and the host memory 106 may be capable of storing a larger amount of data than the memory system 110. The processor 104 and host memory 106 can have an advantage in terms of space and upgrade. For example, the processor 104 and host memory 106 can have less space limitations than processor 134 (see FIG. 2) and memory 144 in the memory system 110. The processor 104 and the host memory 106 can be upgraded to improve performance, which may be distinguishable from the processor 134 and the memory 144 in the memory system 110. In an embodiment, the memory system 110 can utilize the resources of the host 102 in order to increase operation efficiency of the memory system 110.

In an embodiment, as an amount of data that can be stored in the memory system 110 increases, an amount of metadata or map data entries corresponding to the data stored in memory system 110 also increases. When storage capability used to load the metadata in the memory 144 of the controller 130 is limited or restricted, the increase in an amount of loaded metadata or loaded map data entries may cause an operational burden on operations of the controller 130.

For example, because of limitations of space or regions allocated for metadata in the memory 144 of the controller 130, only part of the metadata may be loaded. If loaded metadata does not include specific metadata for a physical location to which the host 102 is intended to access, the controller 130 may have to store, in the memory device 150, the loaded metadata (some of which has been updated), and the controller 130 may also have to load the specific metadata for the physical location to which the host 102 is intended to access. These operations may have to be performed in order for the controller 130 to perform a read operation or a write operation requested by the host 102. As a result, these effects may cause a degradation of performance of the memory system 110.

In some cases, the storage capability of the host memory 106 in the host 102 may be greater (e.g., by tens or hundreds of times) than that of the memory 144 in the controller 130. The memory system 110 may transfer metadata 166 used by the controller 130 to the host memory 106 in the host 102, so that at least some part of the host memory 106 in the host 102 may be accessed by the memory system 110. The at least some part of the host memory 106 can be used as a cache memory for address translation to read or write data in the memory system 110.

In this case, the host 102 may translate a logical address to a physical address based on the metadata 166 stored in the host memory 106, before transmitting the logical address with a request, command or instruction to the memory system 110. Then, the host 102 can transmit the translated physical address with the request, the command or instruction to the memory system 110.

The memory system 110, which receives the translated physical address with the request, command or instruction may skip an internal process of translating the logical address to the physical address and access the memory device 150 based on the physical address that was transferred. In this case, overheads (e.g., operational burden) caused by the controller 130 to load metadata from the memory device 150 for the address translation can be significantly reduced or eliminated, and operational efficiency of the memory system 110 can be enhanced.

Even if the memory system 110 transmits the metadata 166 to the host 102, the memory system 110 can control or manage information related to the metadata 166, such as generation, erase and update of metadata. The controller 130 in the memory system 110 may perform a background operation (e.g., garbage collection and wear leveling) based on an operation state of the memory device 150 and can determine a physical address (e.g., the physical location) in which the memory device 150 for data transferred from the host 102 is stored. Because a physical address of data stored in the memory device 150 can be changed and the host 102 may not recognize the altered physical address, the memory system 110 may be configured to control or manage the information related to metadata 166 that is to be transmitted to the host 102.

While the memory system 110 controls or manages metadata for the address translation, the memory system 110 can determine whether to modify or update the metadata 166 previously transmitted to the host 102. If the memory system 110 determines to modify or update the metadata 166 previously transmitted to the host 102, the memory system 110 can send a signal or a metadata to the host 102 to request the update of the metadata 166 stored in the host 102. The host 102 may update the stored metadata 166 in the host memory 106 in response to a request delivered from the memory system 110. This allows the metadata 166 stored in the host memory 106 to be kept as the latest version, and the operation can proceed without errors even though the host controller interface 108 uses the metadata 166 stored in host memory 106 to translate a logical address to a physical address to be transmitted with the logical address to memory system 110.

The metadata 166 stored in the host memory 106 may include map data entry for translating a logical address to a physical address. According to an embodiment, metadata associating a logical address with a physical address may include two types of map data entries: first map data entry for translating a logical address to a physical address; and a second map data entry for translating a physical address to a logical address. The metadata 166 stored in the host memory 106 may include the first map data entry. The second map data entry can be primarily used for internal operations of the memory system 110, but might not be used for operations requested by the host 102 to store data in the memory system 110 or to read data corresponding to a particular logical address from the memory system 110. In an embodiment, the second map data entry might be not transmitted by the memory system 110 to the host 102.

The controller 130 in the memory system 110 can control (e.g., create, delete, update, etc.) the first map data entry or the second map data entry, and may store the first map data entry or the second map data entry in the memory device 150. Because the host memory 106 is a volatile memory, the metadata 166 stored in the host memory 106 may disappear when an event such as interruption of power supply to the host 102 and the memory system 110 occurs. Accordingly, the controller 130 may keep the latest state of the metadata 166 stored in the host memory 106 of the host 102, and may also store the first map data entry or second map data entry in the memory device 150. The first map data entry or the second map data entry stored in the memory device 150 can be, for example, the most recent one.

Referring to FIG. 1, the memory device 150 may include a Host Performance Booster (HPB) region 162 and a filed-based optimization (FBO) region 164. The HPB region 162 and the write booster region 164 may refer to a logical storage space in which at least one memory block out of the memory blocks in the memory device 150 are functionally allocated or assigned. The HPB region 162 can include a storage space in which data entries corresponding to a map data entry transmitted from the memory system 110 to the host 102 are stored. For example, when there is enough space in the host memory 106 in the host 102 to store map data entries for all data entries stored in the memory device 150, the HPB region 162 can be substantially same with the whole data storage areas in the memory device 150. On the other hand, if there is not enough space to store map data entries in the host memory 106 in the host 102, the HPB region 162 may indicate a part of the data storage areas in the memory device 150.

According to an embodiment, the HPB region 162 can indicate some map data entries, which are transmitted to the host 102 from the memory system 110, from among the whole map data entries stored in the memory device 150.

The FBO region 164 includes a storage area in which data entries are aligned to enable a sequential read operation to improve read performance of the memory system 110. As the use of the memory device 150 increases, some of data entries stored in the memory device 150 might be deleted or updated. For example, even if 10 data entries were initially sequentially programmed into the memory device 150, 1 or 2 of the 10 data entries can be later updated. Herein, the 1 to 2 data entries among the 10 data entries may be programmed in locations that are not sequentially adjacent to locations where the other 8 to 9 data entries have been stored. As a location where an updated data entry is stored becomes randomized, the memory system 110 can perform a random read operation rather than a sequential read operation. The random read operation may have lower read performance than the sequential read operation. To improve this situation, the memory system 110 may perform a file-based optimization (FBO) operation to establish the FBO region 164 in which sequential reading of data entries is possible.

Through sharing a map data entry between the host 102 and the memory system 110, the memory system 110 can recognize the HPB region 162 in the memory device 150, and the host 102 can use the map data entry stored in the host memory 106 for reading a data entry in the HPB region 162. The host 102 can send a read request along with a physical address associated with the data entry. Through this procedure, the memory system 110 can reduce the amount of time spent on translating a logical address input with the read command into the physical address, so that the data input/output speed of the data processing system including the host 102 and the memory system 110 can be improved. In addition, the memory system 110 performs a File-Based Optimization (FBO) operation, so that the FBO region 164 could be prearranged to output data entries corresponding to a read request input from the host 102 through sequential read operation. Through sequential reading of data entries stored in the FBO region 164, the memory system 110 may respond to the read request of the host 102 more quickly.

Sequential reading of the memory system 110 is performed faster than random reading. An order of storing data entries in the memory device 150 might be not the same as an order of reading stored data entries. In addition, it is hard to manage the memory device 150 including non-volatile memory cells based on a sequence of logical addresses used by the host 102, which is an external device. For example, some empty or blank storage areas in the memory device 150 with sparsely remaining areas for storing a data entry corresponding to a logical address later create difficulties, and the data entry is programmed in the empty or blank storage area in response to the logical address. Therefore, when reading data entries stored in the memory device 150, particularly voluminous data, it is common for the memory system 110 to perform random reading to read data entries stored in various locations sparsely in the memory device 150. However, when data entries are positionally sorted and aligned in advance in the memory device 150 based on a preset reference, the memory system 110 can perform sequential reading in response to a read request from the host 102, so that the data I/O operation can speed up.

According to an embodiment, the memory system 110 may perform a File-Based Optimization (FBO) operation for data entries that are stored in the memory device 150 and correspond to a specific logical address range. For example, the memory system 110 can prepare contiguous allocation of a storage area for first data entries corresponding to the first logical address range transmitted along with a request input from the host 102 to arrange the first data entries in an order of logical addresses by moving or migrating the first data entries to the storage area corresponding to contiguously allocated locations. The host 102 may recognize voluminous data or large-capacity information, which can be provided through sequential reading performed by the memory system 110. The host 102 can operate a file system (e.g., FAT, NTFS, ext2, ext3, JFS, NFS, YAFFS, etc.). The host 102 can recognize information about a file that can be understood as a group of data or a group of interrelated information.

From a viewpoint of a user using the host 102, a file may be understood as a group of units or sections logically stored in the data processing system. In response to a request from the host 102, the memory system 110 may store these units or sections in a physical storage device such as the memory device 150 and associate logical addresses with physical addresses (e.g., a mapping process). However, logical addresses input together with write data entry transmitted from the host 102 to the memory system 110 may not be the same to a file. For example, a plurality of logical addresses may be allocated to a single file according to a size of data entries constituting the file. Because the host 102 can recognize which data entries constitute a file, the host 102 can transfer a plurality of logical addresses (e.g., a range of logical addresses or a group of logical addresses) regarding data entries constituting the file to the memory system 110, and the memory system 110 can arrange or sort data entries corresponding to the range of logical addresses or the group of logical addresses range and store the data entries in an order of logical addresses to a specific location (e.g., contiguously allocated locations in the memory device 150). A File-Based Optimization (FBO) operation will be described later with reference to FIGS. 5 and 8.

According to an embodiment, the memory system 110 may perform a File-Based Optimization (FBO) operation for specific data entries without a request input from the host 102. The memory system 110 might not have information about the file system operated by the host 102 but can detect an access pattern of data input/output requests (e.g., read requests, write requests, or erase requests) of the host 102. For example, the controller 130 may determine a logical address range for data alignment based on an access pattern to the memory device 150 in an idle state without a request input from the host 102, which is an external device. In order to migrate data entries corresponding to a determined logical address range, the controller 130 can search and secure a contiguously allocated area in the memory device 150 and move the data entries corresponding to the logical address range to the contiguous allocated area in the memory device. Through a File-Based Optimization (FBO) operation, the memory device 150 may have an FBO region 164 in which data entries obtained through sequential reading in response to a request from the host 102 are stored.

According to embodiments, at least one memory block included in the memory device 150 may be set as the HPB region 162 and at least one other memory block may be included in the FBO region 164. The memory system 110 may exclude a memory block or a storage area belonging to the FBO region 164 from the HPB region 162. Both the HPB region 162 and the FBO region 164 can be established to quickly output a data entry stored in the memory device 150 in response to a read request from the host 102. After the FBO operation is performed on at least some area of the HPB region 162, a map data entry for the corresponding data entry subject to the FBO operation becomes no longer valid. Accordingly, the memory system 110 may need to transmit updated map data entry to the host 102.

However, data entries whose map data entries are updated due to the FBO operation can be read sequentially by the controller 130, so that the data entries can be quickly read and output in response to a read request without sharing the map data entries with the host 102 as the HPB region 162. The memory system 110 may exclude the FBO region 164 in which sequential reading is enabled from the HPB region 162 and add another region to the HPB region 162. Accordingly, the memory system 110 might not transmit the map data entries, associated with the data entries subject to the FBO operation, to the host 102. Instead of the map data entries subject to the FBO operation, the memory system 110 can transmit other map data entries to the host 102. For example, the memory system 110 may control the HPB region 162 and the FBO region 164 not to overlap each other so that more data can be output quickly. Through this method, the memory system 110 can generally perform faster data input/output operations for more data entries stored in the memory device 150, because more data entries can be included in, or added into, either the HPB region 162 or the FBO region 164.

According to an embodiment, the memory system 110 can allocate a plurality of memory blocks included in the memory device 150 for a plurality of zoned namespaces, input from an external device, and access a memory block allocated for one of a plurality of zone-based namespaces in response to a read request input from the external device such as the host 102. A plurality of memory blocks allocated for the zone-based namespace within the memory device 150 may be included in the FBO region 164.

Hereinafter, descriptions will be made focusing on contents that can be technically applied to the controller 130 and the memory device 150 shown in FIG. 1 and the controller 130 and the memory device 150 described in FIGS. 2 to 4. For example, a flash translation layer (FTL) 240 in the controller 130 will be described with reference to FIGS. 3 to 4.

In an embodiment, the roles and functions of the flash conversion layer (FTL) in the controller 130 may be different for an operation purpose or a performance of the memory system 110.

Figure 2:
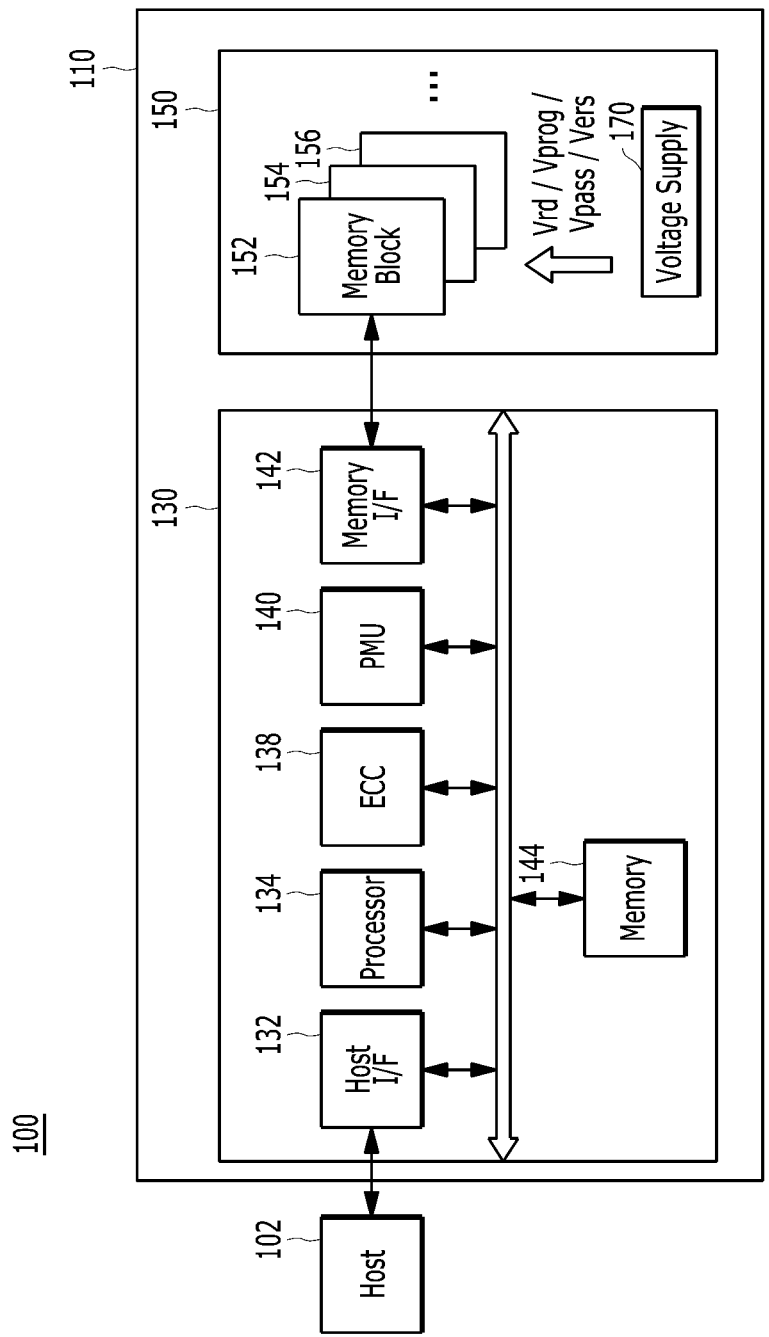
FIG. 2 illustrates a data processing system according to another embodiment of the disclosure.
Figure 3:
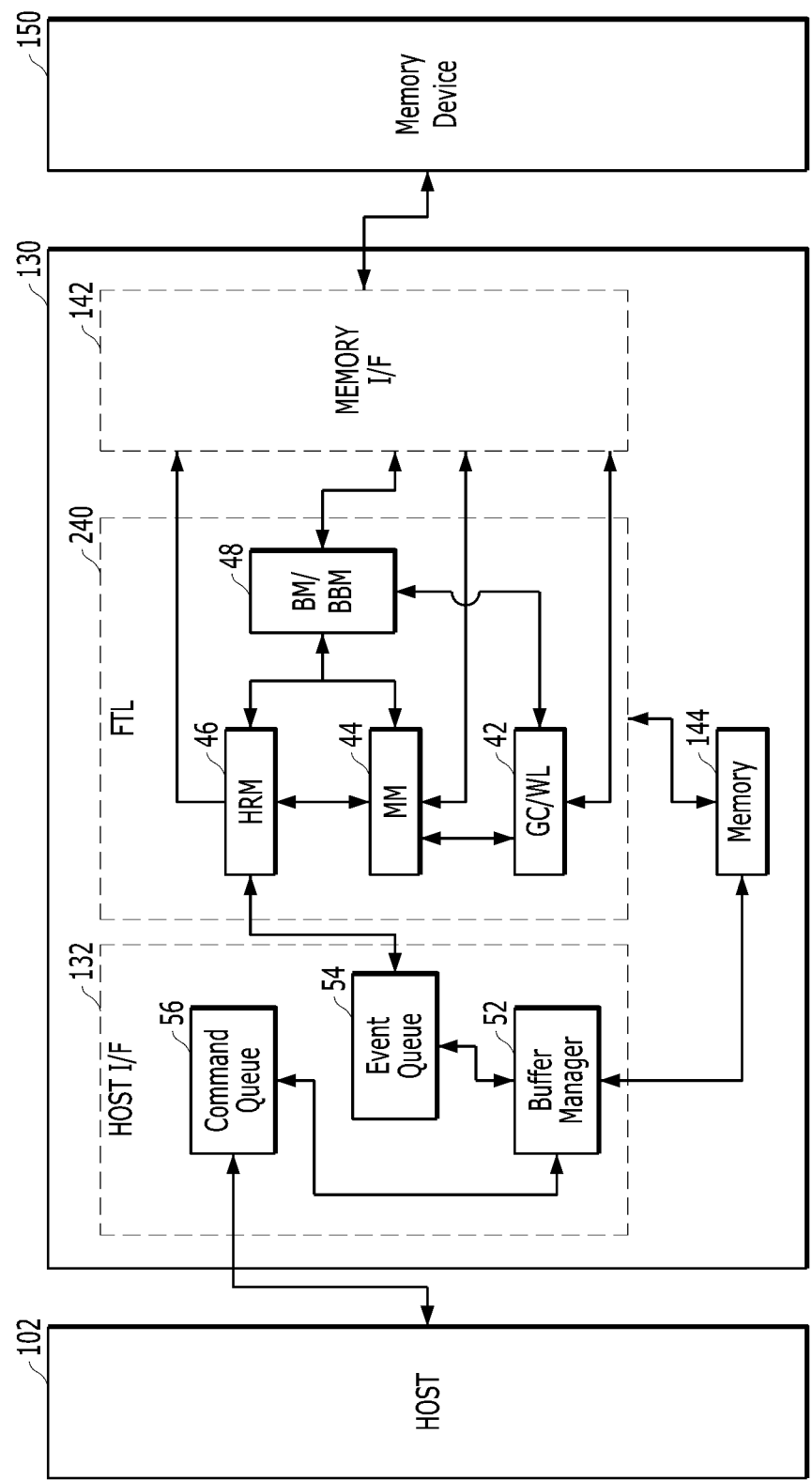
FIG. 3 illustrates a memory system according to another embodiment of the disclosure.

FIG. 2 illustrates a data processing system according to another embodiment of the disclosure, and FIG. 3 illustrates a memory system according to another embodiment of the disclosure.

Referring to FIG. 2, a data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 may be components or elements physically separated from each other. The memory device 150 and the controller 130 may be connected via at least one data path, which for example, may include a channel and/or a way.

According to an embodiment, the memory device 150 and the controller 130 may be components or elements that are functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells in memory device 150 is transferred to the controller 130.

As shown in FIG. 1, the memory device 150 may include a plurality of memory blocks 152, 154, 156. The memory block 152, 154, 156 may be understood as a group of non-volatile memory cells in which data is removed together by a single erase operation. The memory block 152, 154, 156 may include a page, which may correspond to a group of non-volatile memory cells that store data together during a single program operation or output data together during a single read operation. For example, one memory block may include a plurality of pages.

The memory device 150 may include, for example, a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data input to or output from non-volatile memory cells.

According to an embodiment, a memory die may include at least one memory plane. In one embodiment, a memory die may be understood as a set of components implemented on a physically distinguishable substrate. Each memory die may be connected to the controller 130 through a data path and, for example, may include an interface to exchange an item of data and signals with the controller 130.

According to an embodiment, the memory device 150 may include at least one memory block 152, 154, 156, at least one memory plane, or at least one memory die. The internal configuration of the memory device 150 shown in FIG. 1 may be different according to performance of the memory system 110. The memory device 150 may have a different internal configuration from the one shown in FIG. 2 in another embodiment.

Referring to FIG. 1, the memory device 150 may include a voltage supply circuit capable of supplying one or more voltages to the memory block 152, 154, 156. For example, the voltage supply circuit may supply a read voltage Vrd, a program voltage Vprog, a pass voltage Vpass, and/or an erase voltage Vers to a non-volatile memory cell in a memory block. For example, during a read operation (to read data stored in the non-volatile memory cell in one of the memory blocks 152, 154, 156), the voltage supply circuit may supply the read voltage Vrd to a selected non-volatile memory cell.

During a program operation for storing data in a non-volatile memory cell in one of the memory blocks 152, 154, 156, the voltage supply circuit may supply the program voltage Vprog to a selected non-volatile memory cell.

During a read operation or a program operation performed on the selected nonvolatile memory cell, the voltage supply circuit may supply a pass voltage Vpass to a non-selected nonvolatile memory cell. During the erase operation for erasing data stored in the non-volatile memory cell of one of the memory blocks 152, 154, 156, the voltage supply circuit may supply the erase voltage Vers to the memory block.

The memory device 150 may store information regarding various voltages supplied to the memory block 152, 154, 156 based on the operation performed. For example, when a non-volatile memory cell in one of the memory blocks 152, 154, 156 can store multi-bit data, plural levels of the read voltage Vrd for recognizing or reading the multi-bit data entry may be used. The memory device 150 may include a table including information corresponding to plural levels of the read voltage Vrd that correspond to the multi-bit data entry. For example, the table can include bias values stored in a register, where each bias value corresponds to a specific level of the read voltage Vrd. The number of bias values for the read voltage Vrd used for a read operation may be limited to a preset range. Also, the bias values can be quantized.

The host 102 may include or correspond to a portable electronic device (e.g., a mobile phone, an MP3 player, a laptop computer, etc.) or a non-portable electronic device (e.g., a desktop computer, a game player, a television, a projector, etc.).

The host 102 may also include at least one operating system (OS), which can control functions and operations performed in the host 102. The OS can provide interoperability between the host 102 engaged operatively with the memory system 110 and the user who intends to store data in the memory system 110. The OS may support functions and operations corresponding to user requests. For example, the OS can include the file system described in FIG. 1. According to an embodiment, the host 102 can use plural Oss and plural file systems.

By way of example but not limitation, the OS can be classified as a general operating system and a mobile operating system according to mobility of the host 102. The general operating system may be split into a personal operating system and an enterprise operating system according to system requirements or a user environment. Compared with the personal operating system, the enterprise operating systems can be specialized for securing and supporting high performance computing.

The mobile operating system may be subject to support services or functions for mobility (e.g., a power saving function). The host 102 may include a plurality of operating systems. The host 102 may execute multiple operating systems, interlocked with the memory system 110, corresponding to a user request. The host 102 may transmit a plurality of commands corresponding to user requests to the memory system 110, thereby performing operations corresponding to commands in the memory system 110.

The controller 130 in the memory system 110 may control the memory device 150 in response to a request or a command input from the host 102. For example, the controller 130 may perform a read operation to provide an item of data read from the memory device 150 for the host 102 and may perform a write operation (or a program operation) to store an item of data input from the host 102 in the memory device 150. In order to perform data input/output (I/O) operations, the controller 130 may control and manage internal operations for data read, data program, data erase, or the like.

According to an embodiment, the controller 130 can include a host interface 132, a processor 134, error correction circuitry 138, a power management unit (PMU) 140, a memory interface 142, and a memory 144. Components in the controller 130 may vary from those illustrated in FIG. 2 in terms of structure, function, operation performance, and/or other aspects among embodiments. For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components in the controller 130 may be added or omitted based on implementation of the memory system 110.

The host 102 and the memory system 110 may include a controller or an interface for transmitting and receiving signals, an item of data, and the like in accordance with one or more predetermined protocols. For example, the host interface 132 in the memory system 110 may include an apparatus capable of transmitting signals, an item of data, and the like to the host 102 or receiving signals, an item of data, and the like from host 102.

The host interface 132 may receive signals, commands (or requests), and/or an item of data from the host 102. For example, the host 102 and the memory system 110 may use a predetermined protocol to transmit and receive an item of data between each other. Examples of protocols or interfaces supported by the host 102 and the memory system 110 for sending and receiving an item of data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), and the like. According to an embodiment, the host interface 132 is a type of layer for exchanging an item of data with the host 102 and is implemented with, or driven by, firmware called a host interface layer (HIL).

The Non-volatile memory express (NVMe) can be understood as a scalable host controller interface that was designed to address the needs of enterprise and client applications that utilize PCI Express-based solid-state storage, to increase performance and design flexibility of the host 102, servers, computing devices, and the like equipped with the non-volatile memory system 110. PCIe can use a slot or a specific cable for connecting the host 102 (e.g., a computing device) and the memory system 110 (e.g., a peripheral device). For example, PCIe can use a plurality of pins (for example, 18 pins, 32 pins, 49 pins, 82 pins, etc.) and at least one wire (e.g., x1, x4, x8, x16, etc.) to achieve high speed data communication over several hundred MB per second (e.g., 250 MB/s, 500 MB/s, 984.6250 MB/s, 1969 MB/s, and etc.). According to an embodiment, the PCIe scheme may achieve bandwidths of tens to hundreds of Giga bits per second. A system using the NVMe can make the most of an operation speed of the non-volatile memory system 110, such as an SSD, which operates at a higher speed than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and a peripheral device, such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, error correction circuitry 138 can correct error bits of the data to be processed in (e.g., output from) the memory device 150, which may include an error correction code (ECC) encoder and an ECC decoder. The ECC encoder can perform error correction encoding of data to be programmed in the memory device 150 to generate encoded data into which a parity bit is added and store the encoded data in memory device 150. The ECC decoder can detect and correct errors contained in data read from the memory device 150 when the controller 130 reads the data stored in the memory device 150. For example, after performing error correction decoding on the data read from the memory device 150, the error correction circuitry 138 can determine whether the error correction decoding has succeeded and output an instruction signal (e.g., a correction success signal or a correction fail signal). The error correction circuitry 138 can use a parity bit generated during the ECC encoding process for correcting the error bit of the read data. When the number of the error bits is greater than or equal to a threshold number of correctable error bits, the error correction circuitry 138 might not correct error bits but instead may output an error correction fail signal indicating failure in correcting the error bits.

According to an embodiment, the error correction circuitry 138 may perform an error correction operation based on a coded modulation. Examples include a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The error correction circuitry 138 may include all circuits, modules, systems, and/or devices for performing the error correction operation based on at least one of the above described codes.

For example, the ECC decoder may perform hard decision decoding or soft decision decoding to data transmitted from the memory device 150. Hard decision decoding may include an operation of correcting an error by reading digital data of '0' or '1' from a non-volatile memory cell in the memory device 150. Because hard decision decoding handles a binary logic signal, the circuit/algorithm design or configuration may be simpler and processing speed may be faster than soft decision decoding.

Soft decision decoding may quantize a threshold voltage of a non-volatile memory cell in the memory device 150 by two or more quantized values (e.g., multiple bit data, approximate values, an analog value, and the like) in order to correct an error based on the two or more quantized values. The controller 130 can receive two or more alphabets or quantized values from a plurality of non-volatile memory cells in the memory device 150, and then can perform decoding based on information generated by characterizing the quantized values as a combination of information such as conditional probability or likelihood.

According to an embodiment, the ECC decoder may use low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like hard decision decoding, and iteratively repeats it through a message exchange in order to improve reliability of the values. Then, the values are finally determined as data of 1 or 0. For example, a decoding algorithm using LDPC codes can be understood as probabilistic decoding.

Hard decision decoding is one in which the value output from a non-volatile memory cell is coded as 0 or 1. Compared to hard decision decoding, soft decision decoding can determine the value stored in the non-volatile memory cell based on the stochastic information. Regarding bit-flipping (which may be considered an error that can occur in the memory device 150), soft decision decoding may provide improved probability of correcting error and recovering data, as well as provide reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) code for soft decision decoding. The LDPC-CCs code may have a scheme using a linear time encoding and a pipeline decoding based on a variable block length and a shift register.

According to an embodiment, the ECC decoder may use, for example, a Log Likelihood Ratio Turbo Code (LLR-TC) for soft decision decoding. The Log Likelihood Ratio (LLR) may be calculated as a non-linear function for a distance between a sampled value and an ideal value. In addition, Turbo Code (TC) may include a simple code (for example, a Hamming code) in two or three dimensions and repeat decoding in a row direction and a column direction to improve reliability of values.

The power management unit (PMU) 140 may control electrical power provided in the controller 130. The PMU 140 may monitor the electrical power supplied to the memory system 110 (e.g., a voltage supplied to the controller 130) and may provide the electrical power to components in the controller 130. The PMU 140 can not only detect power-on or power-off, but also can generate a trigger signal to enable the memory system 110 to back up a current state urgently when the electrical power supplied to the memory system 110 is unstable. According to an embodiment, the PMU 140 may include a device or a component capable of accumulating electrical power that may be used, for example, in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 when the memory device 150 is a flash memory. For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), and a toggle double data rate (DDR).

The memory 144 may be a type of working memory in the memory system 110 or controller 130, while storing temporary or transactional data that occurred or was delivered for operations in the memory system 110 and the controller 130. For example, the memory 144 may temporarily store read data output from the memory device 150 in response to a request from the host 102, before the read data is output to the host 102. In addition, the controller 130 may temporarily store write data input from the host 102 in the memory 144, before programming the write data in the memory device 150. When the controller 130 controls operations such as data read, data write, data program, data erase, etc., of the memory device 150, an item of data transmitted or generated between the controller 130 and the memory device 150 of the memory system 110 may be stored in memory 144.

In addition to the read data or write data, the memory 144 may store information (e.g., map data, read requests, program requests, etc.) used for inputting or outputting data between the host 102 and the memory device 150. According to an embodiment, the memory 144 may include a command queue, a program memory, a data memory, a write buffer/cache, a read buffer/cache, a data buffer/cache, a map buffer/cache, and/or the like. The controller 130 may allocate some storage space in the memory 144 for a component that is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 within the controller 130, embodiments are not limited thereto. The memory 144 may be located within or external and coupled to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150, in response to a write request or a read request entered from the host 102. According to an embodiment, the processor 134 may execute firmware or other instructions to control the program operation or the read operation in the memory system 110. Herein, the firmware may be referred to as a flash translation layer (FTL). An example of the FTL is described with reference to FIG. 3. According to an embodiment, the processor 134 may be implemented with a microprocessor or a central processing unit (CPU).

According to an embodiment, the memory system 110 may be implemented with at least one multi-core processor. The multi-core processor is a type of circuit or chip including two or more integrated cores considered to be distinct processing regions. For example, when a plurality of cores in the multi-core processor drive or execute a plurality of flash translation layers (FTLs) independently, data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may be independent of a command or a request input from an external device such as the host 102. In one case, an operation performed by the controller 130 in response to the request or the command input from the host 102 may be considered a foreground operation. An operation performed by the controller 130 independently (e.g., regardless the request or the command input from the host 102) may be considered a background operation. The controller 130 can perform foreground or background operations for read, write or program, erase and the like, regarding an item of data in the memory device 150. In addition, a parameter set operation corresponding to a set parameter command or a set feature command as a set command transmitted from the host 102 may be considered a foreground operation. As a background operation without a command transmitted from the host 102, the controller 130 can perform garbage collection (GC), wear leveling (WL), bad block management for identifying and processing bad blocks, or the like. The background operations may be performed in relation to a plurality of memory blocks 152, 154, 156 in the memory device 150.

According to an embodiment, substantially similar operations may be performed as both the foreground operation and the background operation. For example, when the memory system 110 performs garbage collection in response to a request or a command input from the host 102 (e.g., Manual GC), garbage collection can be considered a foreground operation. When the memory system 110 performs garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform parallel processing regarding plural requests or commands input from the host 102 in order to improve performance of the memory system 110. For example, the transmitted requests or commands may be divided and processed in parallel within at least some of a plurality of planes, a plurality of dies or a plurality of chips in the memory device 150. The memory interface 142 may be connected to a plurality of planes, dies or chips in the memory device 150 through at least one channel and at least one way.

When the controller 130 distributes and stores data in the plurality of dies through each channel or each way in response to requests or commands associated with a plurality of pages including non-volatile memory cells, plural operations corresponding to the requests or the commands can be performed individually or in parallel. Such a processing method or scheme can be considered as an interleaving method. Because data input/output speed of the memory system 110 operating with the interleaving method may be faster than that without the interleaving method, data I/O performance of the memory system 110 can be improved.

By way of example but not limitation, the controller 130 can recognize statuses regarding a plurality of channels (or ways) associated with a plurality of memory dies in the memory device 150. The controller 130 may determine the status of each channel or each way as one of, for example, a busy status, a ready status, an active status, an idle status, a normal status, and/or an abnormal status. The determination of which channel or way an instruction (and/or a data) is delivered through by the controller can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a set format or structure. For instance, the descriptors may include device descriptors, configuration descriptors, unit descriptors, and the like. The controller 130 can refer to, or use, the descriptors to determine which channel(s) or way(s) an instruction or a data is exchanged via.

Referring to FIG. 2, the memory device 150 in the memory system 110 may include memory blocks 152, 154, 156. Each of the memory blocks 152, 154, 156 includes a plurality of non-volatile memory cells. According to an embodiment, the memory block 152, 154, 156 can be a group of non-volatile memory cells erased together. The memory block 152, 154, 156 may include a plurality of pages, one or more of which may correspond to a group of non-volatile memory cells which are read or programmed together. In one embodiment, each memory block 152, 154, 156 may have a three-dimensional stack structure for high integration. Further, the memory device 150 may include a plurality of dies, each die including a plurality of planes, each plane including the memory blocks 152, 154, 156. Configuration of the memory device 150 can be different for performance of the memory system 110.

As shown in FIG. 2, the memory blocks 152, 154, 156 are in the memory device 150. The memory blocks 152, 154, 156 can be any of single-level cell (SLC) memory blocks, multi-level cell (MLC) Cell) memory blocks, or the like, according to the number of bits that can be stored or represented in one memory cell. An SLC memory block includes a plurality of pages implemented by memory cells, each storing one bit of data. An SLC memory block can have high data I/O operation performance and high durability. The MLC memory block includes a plurality of pages implemented by memory cells, each storing multi-bit data entry (e.g., two bits or more). The MLC memory block can have larger storage capacity for the same space compared to the SLC memory block. The MLC memory block can be highly integrated in view of storage capacity.

In an embodiment, the memory device 150 may be implemented with MLC memory blocks such as a double level cell (DLC) memory block, a triple-level cell (TLC) memory block, a quadruple-level cell (QLC) memory block and a combination thereof. A double-level cell (DLC) memory block may include a plurality of pages implemented by memory cells, each capable of storing 2-bit data. A triple-level cell (TLC) memory block can include a plurality of pages implemented by memory cells, each capable of storing 3-bit data. A quadruple-level cell (QLC) memory block can include a plurality of pages implemented by memory cells, each capable of storing 4-bit data. In one embodiment, the memory device 150 can be implemented with a block including a plurality of pages implemented by memory cells, each capable of storing five or more bits of data.

According to an embodiment, the controller 130 may use a multi-level cell (MLC) memory block in the memory device 150 as an SLC memory block that stores one-bit data in one memory cell. A data input/output speed of the multi-level cell (MLC) memory block can be slower than that of the SLC memory block. For example, when the MLC memory block is used as the SLC memory block, a margin for a read or program operation can be reduced. The controller 130 can utilize a faster data input/output speed of the multi-level cell (MLC) memory block when using the multi-level cell (MLC) memory block as the SLC memory block (e.g., a memory block in the write booster region 164 shown in FIG. 1). For example, the controller 130 can use the MLC memory block as a buffer to temporarily store an item of data, because the buffer may use a high data input/output speed for improving performance of the memory system 110.

Referring to FIGS. 1 and 2, the memory system 110 may quickly store data entries in the memory device 150 by using the SLC buffer during a write operation to improve write speed. After that, the memory system 110 may move or migrate the data entries stored in the SLC buffer to either the HPB region 162 or the FBO region 164 to improve read speed. The HPB area 162 and the FBO area 164 may include multi-level cell (MLC) memory blocks. For example, the memory system 110 may move the data entries stored in the SLC buffer to the HPB region 162 or the FBO region 164 according to attributes of the data entries. In a case of data requiring fast input/output although a size of a file or a group of data entries is smaller than a preset standard, the memory system 110 may migrate the corresponding data entries to the HPB region 162. If the size of the file or the group of data entries is larger than, or equal to, the preset standard or if the host 102 can process the file or the group of data entries sequentially due to the characteristics of the file or the group of data entries (e.g., a video file, etc.), the memory system 110 can migrate the data entries to the FBO region 164.

Further, according to an embodiment, the controller 130 may program data in a multi-level cell (MLC) a plurality of times without performing an erase operation on a specific MLC memory block in the memory device 150. Non-volatile memory cells have a feature that does not support data overwrite. However, the controller 130 may use a feature in which a multi-level cell (MLC) may store multi-bit data, in order to program plural 1-bit data in the MLC a plurality of times. For a MLC overwrite operation, the controller 130 may store the number of program times as separate operation information when 1-bit data is programmed in a non-volatile memory cell. In an embodiment, an operation for uniformly levelling threshold voltages of non-volatile memory cells can be carried out before other data is overwritten in the same non-volatile memory cells.

In an embodiment, the memory device 150 is embodied as a non-volatile memory such as a flash memory, for example, as a NAND flash memory, a NOR flash memory, and the like. In an embodiment, the memory device 150 may be implemented by at least one of a phase change random access memory (PCRAM), a ferroelectrics random access memory (FRAM), a spin transfer torque random access memory (STT-RAM), and a spin transfer torque magnetic random access memory (STT-MRAM), or the like.

Referring to FIG. 3, a controller 130 in a memory system may operate with a host 102 and memory device 150. As illustrated, the controller 130 can have a layered structure. For example, the controller 130 includes a host interface 132, a flash translation layer (FTL) 240, as well as a memory interface 142, and a memory 144 previously identified in connection with FIG. 2.

According to an embodiment, the error correction circuitry 138 illustrated in FIG. 2 may be included in the flash translation layer (FTL) 240. In one embodiment, the error correction circuitry 138 may be implemented as a separate module, a circuit, firmware, or the like, which is included in, or associated with, the controller 130.

The host interface 132 may be capable of handling commands, data, and the like transmitted from the host 102. By way of example but not limitation, the host interface 132 may include a command queue 56, a buffer manager 52, and an event queue 54. The command queue 56 may sequentially store commands, data, and the like, received from the host 102 and output them to the buffer manager 52, for example, in an order in which they are stored. The buffer manager 52 may classify, manage, or adjust the commands, the data and the like received from the command queue 56. The event queue 54 may sequentially transmit events for processing the commands, the data, and the like received from the buffer manager 52.

A plurality of commands or data of the same characteristic (e.g., read or write commands) may be transmitted from the host 102, or plurality of commands and data of different characteristics may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what type of internal operation the controller 130 will perform according to the characteristics of commands, data, and the like, which have been entered from the host 102. The host interface 132 can determine a processing order and a priority of commands, data and the like, based at least on their characteristics.

According to characteristics of commands, data, and the like transmitted from the host 102, the buffer manager 52 in the host interface 132 is configured to determine whether the buffer manager should store commands, data, and the like, in the memory 144, or whether the buffer manager should deliver the commands, the data, and the like into the flash translation layer (FTL) 240. The event queue 54 receives events, entered from the buffer manager 52, which are to be internally executed and processed by the memory system 110 or the controller 130 in response to the commands, the data, and the like, transmitted from the host 102, in order to deliver the events to the flash translation layer (FTL) 240 in the order received.

In accordance with an embodiment, the flash translation layer (FTL) 240 illustrated in FIG. 3 may implement a multi-thread scheme to perform the data input/output (I/O) operations. A multi-thread FTL may be implemented through a multi-core processor using multi-thread included in the controller 130.

In accordance with an embodiment, the flash translation layer (FTL) 240 can include a host request manager (HRM) 46, a map manager (MM) 44, a state manager 42, and a block manager 48. The host request manager (HRM) 46 can manage the events entered from the event queue 54. The map manager (MM) 44 can handle or control a map data. The state manager 42 can perform garbage collection (GC) or wear leveling (WL). The block manager 48 can execute commands or instructions onto a block in the memory device 150.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map manager (MM) 44, to determine a physical address corresponding to the logical address that is entered with the events. The host request manager (HRM) 46 can send a read request with the physical address to the memory interface 142, to process the read request (handle the events). In an embodiment, the host request manager (HRM) 46 can send a program request (write request) to the block manager 48 to program data to a specific empty page (no data) in the memory device 150, and then can transmit a map update request corresponding to the program request to the map manager (MM) 44, in order to update an item relevant to the programmed data in information of mapping the logical-physical addresses to each other.

The block manager 48 can convert a program request delivered from the host request manager (HRM) 46, the map manager (MM) 44, and/or the state manager 42, into a flash program request used for the memory device 150 in order to manage flash blocks in the memory device 150. To maximize or enhance program or write performance of the memory system 110 (e.g., see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

In an embodiment, the block manager 48 can be configured to manage blocks in the memory device 150 according to the number of valid pages, select and erase blocks having no valid pages when a free block is needed, and select a block including the least number of valid pages when it is determined that garbage collection is to be performed. The state manager 42 can perform garbage collection to move the valid data to an empty block and erase the blocks containing the moved valid data so that the memory device 150 may have enough free blocks (i.e., empty blocks with no data). When the block manager 48 provides information regarding a block to be erased to the state manager 42, the state manager 42 may check all flash pages of the block to be erased to determine whether each page is valid.

For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process various requests, for example, queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

When garbage collection is performed, the state manager 42 copies valid page(s) into a free block, and the host request manager (HRM) 46 can program the latest version of the data for the same logical address of the page and currently issue an update request. When the state manager 42 requests the map update in a state in which copying of valid page(s) is not completed normally, the map manager 44 might not perform the mapping table update. This is because the map request is issued with old physical information when the state manger 42 requests a map update and a valid page copy is completed later. The map manager 44 may perform a map update operation to ensure accuracy when, or only if, the latest map table still points to the old physical address.

Figure 4:
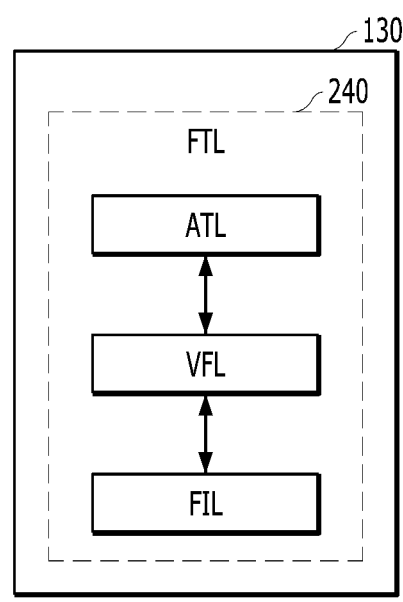
FIG. 4 illustrates a layered structure of a flash translation layer according to another embodiment of the disclosure.

FIG. 4 illustrates a layered structure of a flash translation layer according to another embodiment of the disclosure. In an embodiment of a controller 130 of FIGS. 1 to 3, and referring to FIG. 4, the controller 130 may include a flash translation layer (FTL) 240, which can be divided into three layers: an address translation layer ATL; a virtual flash layer VFL; and a flash Interface Layer FIL.

For example, the address translation layer ATL may convert a logical address LA transmitted from a file system to a logical page address. The address translation layer ATL can perform an address translation process regarding a logical address space. For example, the address translation layer ATL can perform an address translation process based on map data entry to which the logical page address LPA of the flash memory 140 is mapped to the logical address LA transmitted from the host. Such logical-to-logical address map data entry (hereinafter referred to as L2L mapping) may be stored in an area in which metadata is stored in the memory device 150.

The virtual flash layer VFL may convert the logical page address LPA, which is mapped by the address translation layer ATL, to a virtual page address VPA. The virtual page address VPA may correspond to a physical address of a virtual memory device. For example, the virtual page address VPA may correspond to the memory block 60 in the memory device 150. If there is a bad block among the memory blocks 60 in the memory device 150, the bad block may be excluded by the virtual flash layer VFL.

In addition, the virtual flash layer VFL can include a recovery algorithm for scanning a scan area to restore the logical-to-virtual address map data entry (L2V mapping) stored in the memory device 150 and map data entry in the data region for storing user data. The recovery algorithm can be capable of recovering the logical-to-virtual address map data entry (L2V mapping). The virtual flash layer VFL may perform an address conversion process regarding the virtual address space, based on the logical-to-virtual address map data entry (L2V mapping) restored through such the recovery algorithm.

The flash interface layer FIL can convert a virtual page address of the virtual flash layer VFL to a physical page address of the memory device 150. The flash interface layer FIL performs a low-level operation for interfacing with the memory device 150. For example, the flash interface layer FIL can include a low-level driver for controlling hardware of the memory device 150, an error correction code (ECC) for checking and correcting an error in data transmitted from the memory device 150, and a module for performing operations such as Bad Block Management (BBM).

Figure 5:
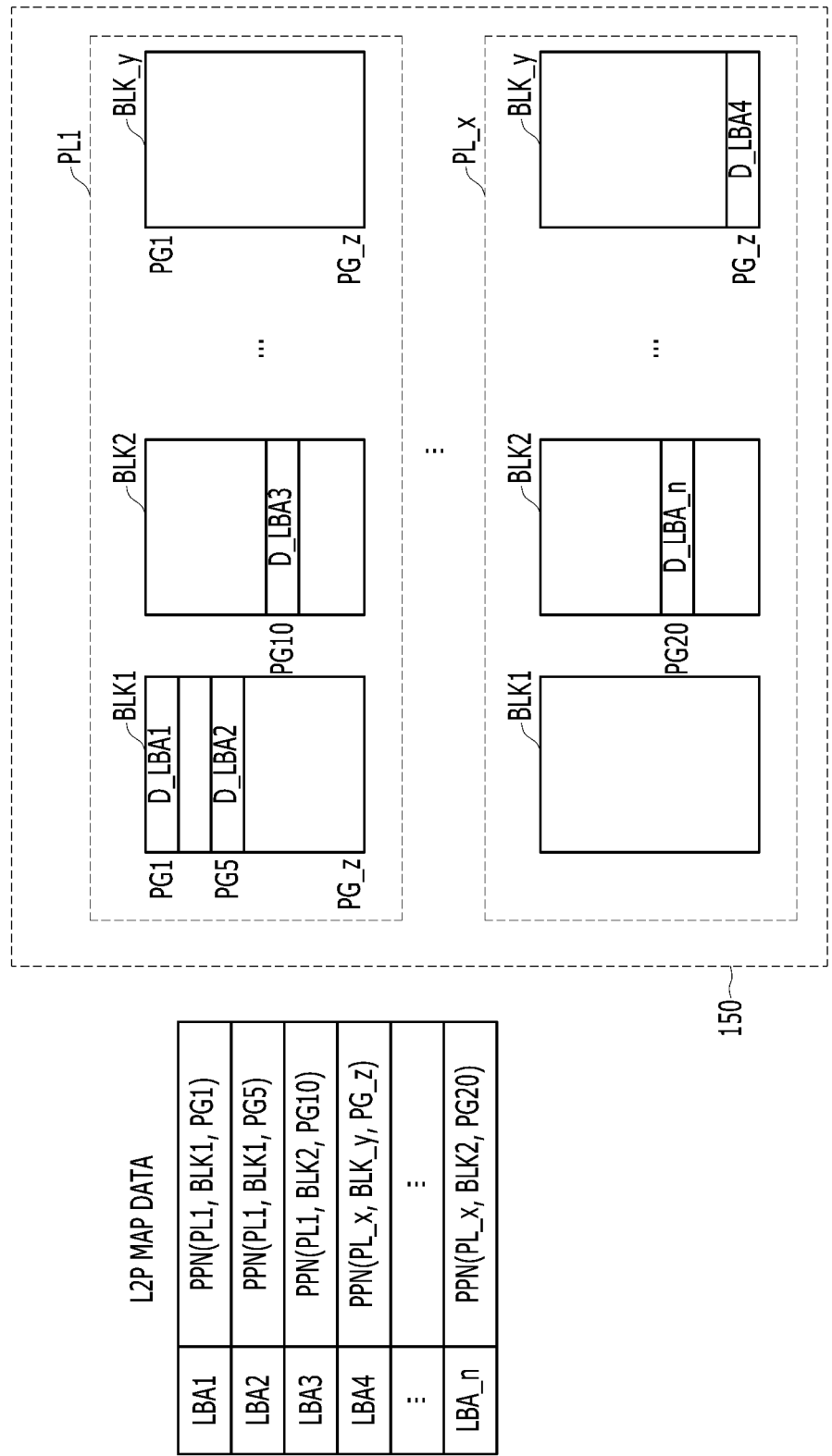
FIG. 5 illustrates a data entry and a map data entry stored in a memory device according to another embodiment of the disclosure.

FIG. 5 illustrates a data entry and a map data entry stored in a memory device according to another embodiment of the disclosure.

Referring to FIG. 5, a memory device 150 can include a plurality of memory planes PL1, . . . , PL_x. As described in FIG. 2, the memory device 150 can include a plurality of memory dies, a plurality of memory planes PL1, . . . , PL_x, or a plurality of memory blocks BLK1, BLK2, . . . , BLK_y. Each memory block BLK1, BLK2, . . . , BLK_y may include a plurality of pages PG1, . . . , PG_z. Each page PG1, . . . , PG_z may include a plurality of non-volatile memory cells.

As described with reference to FIG. 1, when data entries are continuously stored and read continuously, data input/output speed of the memory system 110 including the memory device 150 might increase. However, difficulties arise when the memory device 150 empties a reserve area (e.g., a plurality of pages PG1, . . . , PG_z) for data entries to be programmed later corresponding to a specific data size or a specific logical address range and stores other data entries in another area following the reserve area. This is because data entries are sequentially programmed from the first page PG1 to the last page PG_z of a specific memory block (e.g., BLK1) in the memory device 150. In addition, it is difficult to overwrite data entries on the plurality of pages PG1, . . . PG_z including non-volatile memory cells. Accordingly, when a data entry stored in the memory device 150 is updated, an updated data entry may be programmed in another location that is different and distinguishable from a previous location. Referring to FIG. 5, plural data entries D_LBA1, D_LBA2, D_LBA3, D_LBA4, . . . , D_LBA_n corresponding to plural logical addresses LBA1, LBA2, LBA3, LBA4, . . . , LBA_n used by the host 102 may be distributed and stored in different areas of in the memory device 150, and not in sequential areas in a same memory block.

After storing a data entry transferred from the host 102 in the memory device 150, the memory system 110 may generate map data (e.g., L2P MAP DATA). The map data entry may connect a logical address LBA1, LBA2, LBA3, LBA4, . . . , LBA_n and a physical address (e.g., a physical location in the memory device 150). For example, referring to the map data (e.g., L2P MAP DATA), a first data entry D_LBA1 corresponding to a first logical address LBA1 is stored in a location corresponding to a physical address PPN indicating a first page PG1 of a first memory block BLK1 of a first plane PL1 in the memory device 150. A third data entry D_LBA3 corresponding to a third logical address LBA3 is stored in another location corresponding to another physical address PPN indicating a tenth page PG10 of a second memory block BLK2 of the first plane PL1 in the memory device 150.

Even if data entries in the memory device 150 are not arranged or sorted in an order of logical addresses, the memory system 110 may improve data input/output performance through the use of an HPB region 162. Referring to FIGS. 1 and 5, the HPB region 162 may be differently established according to different embodiments. For example, the first memory block BLK1 in the first plane PL1 may be set as the HPB region 162. In this case, the memory system 110 may transmit map data entries, which are associated with the first data entry D_LBA1 and a second data entry D_LBA2 stored in the first memory block BLK1 in the first plane PL1, to the host 102. When the host 102 transmits a read request for the first data D_LBA1 or the second data D_LBA2 to the memory system 110, a physical address (PPN) for the first data D_LBA1 or the second data D_LBA2 can be transmitted along with the read request to the memory system 110. Thus, the memory system 110 might not need to perform address translation based on the map data (e.g., L2P MAP DATA).

Meanwhile, a second memory block BLK2 in the first plane PL1 might not be set as the HPB region 162. In this case, the host 102 does not recognize a physical address (PPN) of the third data entry D_LBA3. When the host 102 transfers the third logical address LBA3 and the read request to the memory system 110, the memory system 110 performs address translation to obtain the physical address of the third data entry D_LBA3, which indicates the tenth page PG10 of the second memory block BLK2 of the first plane PL1 in the memory device 150. The controller 130 can read the third data entry D_LBA3 after the address translation, and output the third data entry D_LBA3 to the host 102.

Depending on an embodiment, the HPB region 162 may be set to a range of logical addresses. For example, the first to tenth logical addresses LBA1 to LBA10 may be set as the HPB region 162. The memory system 110 can transmit the physical addresses PPNs corresponding to the first to tenth logical addresses LBA1 to LBA10 to the host 102. Since the host 102 can determine the physical addresses (PPNs) associated with the first to fourth data entries D_LBA1, D_LBA2, D_LBA3, D_LBA4, a physical address PPN associated with one of the first to fourth data entry D_LBA1, D_LBA2, D_LBA3, D_LBA4 may be transmitted to the memory system 110 along with a read request. On the other hand, because the nth logical address LBA_n is not set as the HPB region 162, the host 102 is unable to recognize the physical address PPN corresponding to the nth logical address LBA_n. When the host 102 transmits the n-th logical address (LBA_n) to the memory system 110 along with a read request, the memory system 110 performs address translation to obtain a physical address of the nth data entry D_LBA_n, which indicates a twentieth page PG20 of a second memory block BLK2 of an x-th plane PL_x in the memory device 150. The controller 130 can read the nth data entry D_LBA_n, after the address translation, and output the nth data entry D_LBA_n to the host 102. Depending on the HPB region 162, a difference may occur in data input/output speed corresponding to a read request transmitted from the host 102 to the memory system 110. The HPB operation will be described later with reference to FIG. 6.

Figure 6:
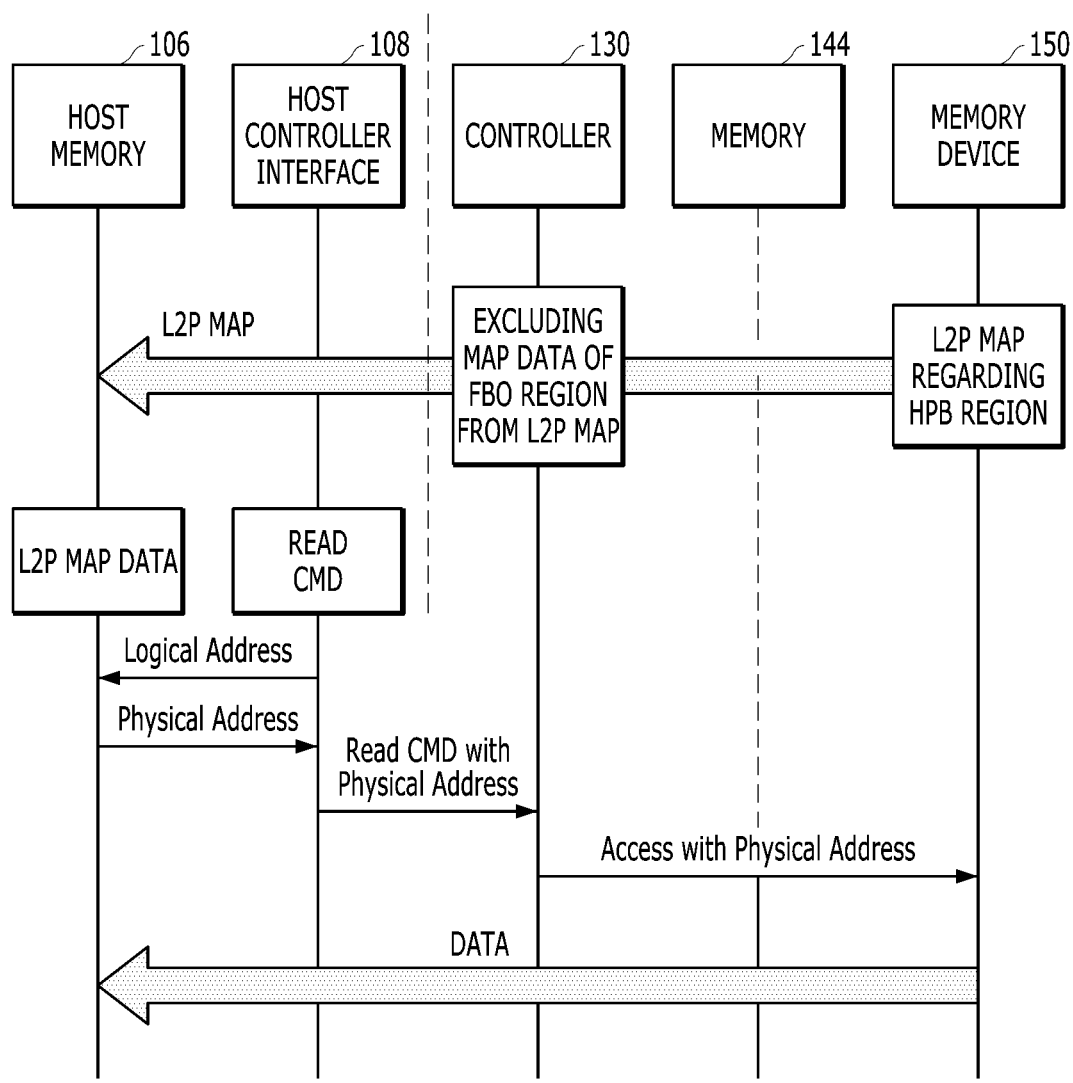
FIG. 6 illustrates a read operation of a host and a memory system in a data processing system according to another embodiment of the disclosure.

FIG. 6 illustrates a read operation of a host and a memory system in a data processing system according to an embodiment of the disclosure. Referring to FIGS. 1 to 6, an operation in which the host 102 reads data in the memory system 110 when meta data 166 including map data entries is stored in the host memory 106 in the host 102 will be described.

Power is supplied to the host 102 and the memory system 110, and then the host 102 and the memory system 110 can be engaged with each other. When the host 102 and the memory system 110 cooperate, metadata (L2P MAP) stored in the memory device 150 can be transferred to the host memory 106. At this time, the controller 130 may set the HPB region 162 and read metadata (L2P MAP) for the HPB region 162 from the memory device 150. The controller 130 may exclude map data entries for sequentially readable data entries from the metadata (L2P MAP) for the HPB region 162. For example, map data entries associated with the FBO region 164 may be excluded from metadata (L2P MAP) for the HPB region 162. If there is not enough map data entries to be transmitted to, and stored in, the host memory 106, the controller 130 can additionally set a storage area as the HPB region 162 in the memory device 150 to transfer the metadata (L2P MAP) to the host memory 106.

When a read command (Read CMD) is issued by the processor 104 in the host 102, the read command is transmitted to the host controller interface 108. After receiving the read command, the host controller interface 108 searches for a physical address corresponding to a logical address corresponding to the read command in the metadata (L2P MAP) stored in the host memory 106. Based on the metadata (L2P MAP) stored in the host memory 106, the host controller interface 108 can recognize the physical address corresponding to the logical address. The host controller interface 108 carries out an address translation for the logical address associated with the read command.

The host controller interface 108 transfers the read command (Read CMD) with the logical address as well as the physical address to the controller 130 of the memory system 110. The controller 130 can access the memory device 150 based on the physical address transferred with the read command. Data stored at a location corresponding to the physical address in the memory device 150 can be transferred to the host memory 106 in response to the read command (Read CMD).

In some cases, an operation of reading data stored in the memory device 150 including a nonvolatile memory may take more time than an operation of reading data stored in the host memory 106, which is a volatile memory. In the above-described read operation performed in response to the read command (Read CMD), since the controller 130 receives the physical address with the read command (Read CMD), the controller 130 can skip or omit an address translation to search for a physical address corresponding to the logical address provided from the host 102. For example, the controller 130 may not have to load metadata from the memory device 150 or may replace the metadata stored in the memory 144 when the controller 130 cannot find metadata for the address translation in the memory 144. This allows the memory system 110 to perform a read operation requested by the host 102 more quickly.

Figure 7:
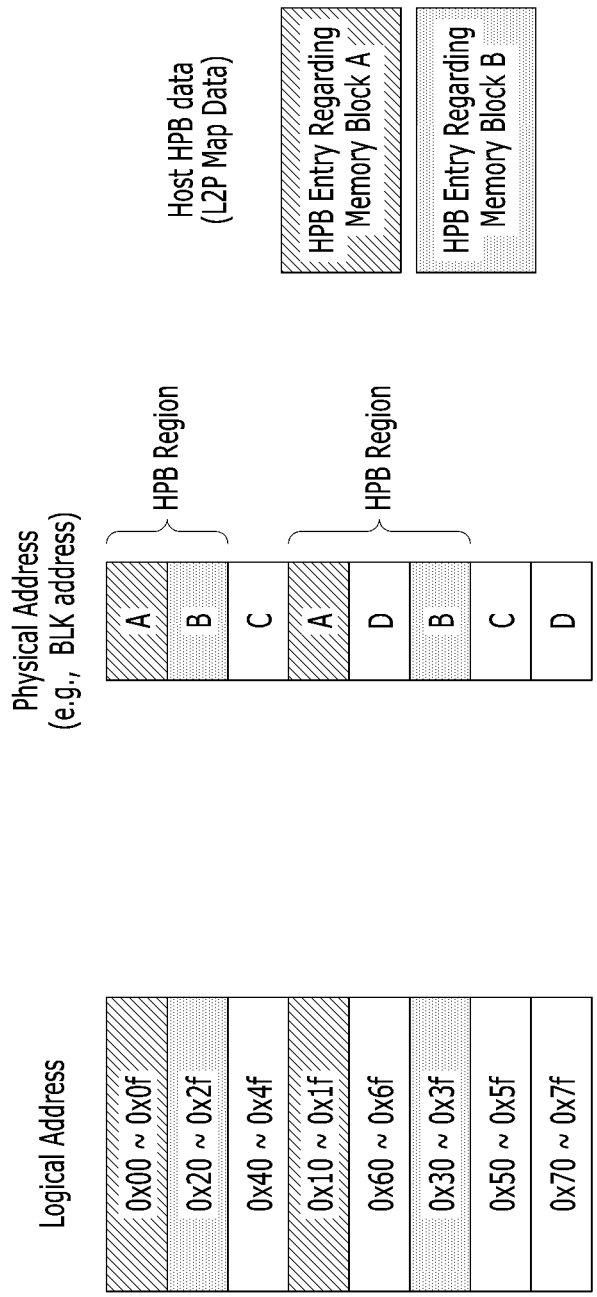
FIG. 7 illustrates a host performance boost (HPB) region according to an embodiment of the disclosure.

FIG. 7 illustrates a host performance boost (HPB) region according to an embodiment of the disclosure.

Referring to FIG. 7, for convenience of description, logical addresses can be grouped by a preset range. Physical addresses indicating locations at which data entries are stored in the memory device 150 can be simplified as a memory block address. For example, data entries corresponding to a first logical address range (0x00 to 0x0f) may be stored in a first memory block A, and other data entries corresponding to a second logical address range (0x20 to 0x2f) may be stored in a second memory block B. Data entries corresponding to a third logical address range (0x40 to 0x4f) may be stored in a third memory block C, and data entries corresponding to a fourth logical address range (0x10 to 0x1f) may be stored in the first memory block A. Data entries corresponding to a fifth logical address range (0x60 to 0x6f) may be stored in a fourth memory block D, and other data entries corresponding to a sixth logical address range (0x30 to 0x3f) may be stored in the second memory block B.

When a space allocated for the memory system 110 is sufficient in the host memory 106 of the host 102 described in FIG. 1, the memory system 110 can transmit to the host 102 the whole map data entries regarding the whole data entries stored in the memory device 150 for storing the whole map data entries in the host memory 106. However, when the space allocated for the memory system 110 in the host memory 106 is not sufficient, the memory system 110 may select some among the whole map data entries, which is to be transmitted to, and stored in, the host memory 106. Referring to FIGS. 1 and 7, the first memory block A and the second memory block B in the memory device 150 may be set as the HPB region 162. Map data entries (HPB entry) for data entries stored in the first memory block A and the second memory block B may be transmitted to the host 102 and stored in the host memory 106. The host 102 can perform address translation regarding the data entries stored in the first memory block A and the second memory block B based on the map data entries (Host HPB data) stored in the host memory 106, so that a physical address used in the memory device 150 can be recognized.

Figure 8:
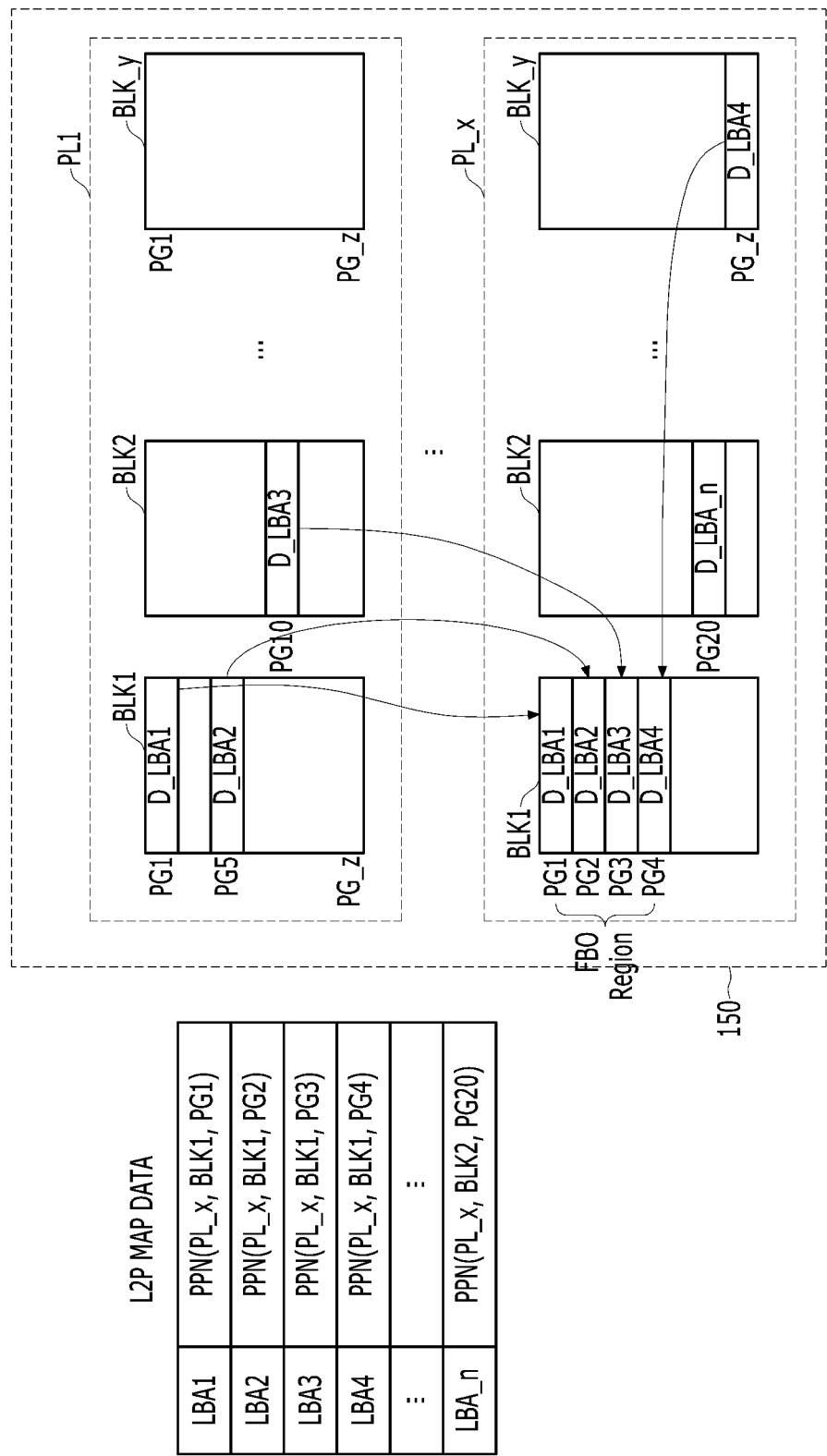
FIG. 8 illustrates a file-based optimization (FBO) region according to another embodiment of the disclosure.

FIG. 8 illustrates a file-based optimization (FBO) region according to an embodiment of the disclosure. Specifically, FIG. 8 illustrates generation of the FBO region after performing a FBO operation on some data entries stored in the memory device 150 shown in FIG. 5 and update of map data (L2P MAP DATA) regarding the data entries that are subject to the File-Based Optimization (FBO) operation.

Referring to FIGS. 5 and 8, the first to fourth data entries D_LBA1 to D_LBA4 corresponding to the first to fourth logical addresses LBA1 to LBA4 can be distributed over, and stored in, several memory blocks of the memory device 150. By arranging or sorting the first to fourth data entries D_LBA1 to D_LBA4 according to an order of logical addresses through the FBO operation, the first to fourth data entries D_LBA1 to D_LBA4 can be sorted and arranged to enable sequential reading corresponding to the first to fourth logical addresses LBA1 to LBA4.

The memory system 110 may search for an empty area capable of storing the first to fourth data entries D_LBA1 to D_LBA4 associated with the first to fourth logical addresses LBA1 to LBA4 in the memory device 150. Referring to FIG. 8, a first memory block BLK1 in the xth memory plane PL_x is empty (e.g., the first memory block BLK1 in the xth memory plane PL_x is a free memory block). The memory system 110 may sequentially migrate the first to fourth data entries D_LBA1 to D_LBA4 stored elsewhere in the memory device 150 to the first memory block BLK1 in the xth memory plane PL_x. For example, the first data entry D_LBA1 stored in a location of the physical address PPN indicating the first page PG1 of the first memory block BLK1 in the first memory plane PL1 is copied to a new location of the physical address PPN indicating the first page PG1 of the first memory block BLK1 in the xth memory plane PL_x. After the first data entry D_LBA1 is copied, the physical address PPN associated with the first logical address LBA1 in the map data (L2P MAP DATA) is updated for indicating the new location, i.e., the first page PG1 of the first memory block BLK1 in the first memory plane PL_x. When the map data (L2P MAP DATA) is updated, the first data entry D_LBA1 stored in the previous location, i.e., the first page PG1 of the first memory block BLK1 in the first memory plane PL1 can become no longer valid.

Similar to the first data entry D_LBA1, the second to fourth data entries D_LBA2 to D_LBA4 may also be sequentially copied to the first memory block BLK1 in the xth memory plane PL_x. Through these operations, the first to fourth data entries D_LBA1 to D_LBA4 are sequentially programmed in the first to fourth pages PG1 to PG4 of the first memory block BLK1 in the xth memory plane PL_x. When the host 102, which is an external device, transmits a read request along with the first to fourth logical addresses LBA1 to LBA4 to the memory system 110, the memory system 110 can perform sequential reading in response to the read request for the first to fourth logical addresses LBA1 to LBA4. The first to fourth pages PG1 to PG4 of the memory block BLK1 may be sequentially read so that the first to fourth data entries D_LBA1 to D_LBA4 can be output quickly to the host 102. Here, the first to fourth pages PG1 to PG4 of the first memory block BLK1 in the xth memory plane PL_x can become an FBO region.

In FIGS. 5 and 8, for convenience of description, migrating or moving a data entry stored from a page to another page in the memory device 150 is described as an example of a File-Based Optimization (FBO) operation. Depending on the embodiment, the FBO operation can be performed in the memory device 150 based on various data storage structures for storing a data entry in a superblock, storing a plurality of data entries in a single page, or storing a single data entry in a plurality of pages.

Figure 9:
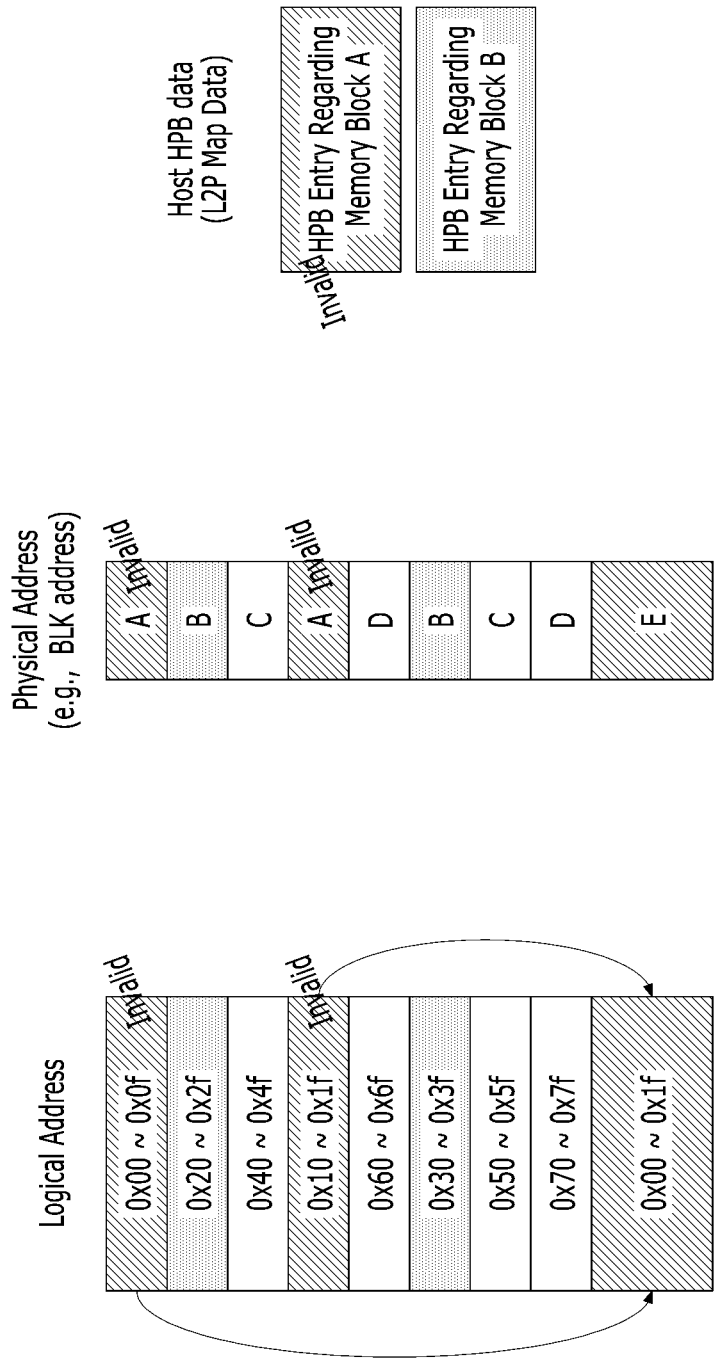
FIG. 9 illustrates a change in the HPB region after an FBO operation is performed.

FIG. 9 illustrates a change in the HPB region after an FBO operation is performed. Specifically, FIG. 9 describes a situation in which the HPB region described in FIG. 7 is changed due to the FBO operation.

Referring to FIGS. 7 and 9, data entries corresponding to a plurality of logical address ranges may be stored in a plurality of memory blocks A, B, C, D. For example, first data entries corresponding to the first logical address range (0x00 to 0x0f) may be stored in the first memory block A, and second data entries corresponding to the second logical address range (0x20 to 0x2f) may be stored in the second memory block B. Third data entries corresponding to the third logical address range (0x40 to 0x4f) may be stored in the third memory block C, and fourth data entries corresponding to the fourth logical address range (0x10 to 0x1f) may be stored in the first memory block A. The first memory block A and the second memory block B in the memory device 150 may be set as the HPB region 162. Map data entries (HPB entry) for data entries stored in the first memory block A and the second memory block B may be transmitted to the host 102 and stored in the host memory 106.

The memory system 110 can perform an FBO operation. Through the FBO operation, the first data entries corresponding to the first logical address range (0x00 to 0x0f) and the second data entries corresponding to the fourth logical address range (0x10 to 0x1f) are sequentially migrated to another memory block E. Map data entries associated with the first and fourth logical address ranges (0x00 to 0x0f, 0x10 to 0x1f) may also be updated according to data migration. Previous map data entries indicating that the first data entries corresponding to the first logical address range (0x00 to 0x0f) and the fourth data entries corresponding to the fourth logical address range (0x10 to 0x1f) are stored in the memory block A would be no longer valid (invalid). As the first and fourth data entries corresponding to the first logical address range (0x00 to 0x0f) and the fourth logical address range (0x10 to 0x1f) are sequentially stored in the memory block E through the FBO operation, the memory system 110 can perform sequential reading in response to a read request for the first and fourth data entries corresponding to a combined logical address range (0x00 to 0x1f) including the first logical address range (0x00 to 0x0f) and the fourth logical address range (0x10 to 0x1f).

Because the first memory block A in the memory device 150 has been set to the HPB region 162, map data entries (HPB entry regarding the memory block A) for the first and fourth data entries corresponding to a combined logical address range (0x00 to 0x1f) including to the first logical address range (0x00 to 0x0f) and the fourth logical address range (0x10 to 0x1f) has been stored in the host memory 106. Among HPB data (e.g., map data entries) stored in the host memory 106, the first and fourth data entries corresponding to the first logical address range (0x00 to 0x0f) and the fourth logical address range (0x10 to 0x1f) is migrated to another memory block E, and map data entries associated with the memory block A (HPB entry regarding memory block A) is no longer valid (invalid).

The memory system 110 may notify the host 102 that some map data entries (HPB entry regarding memory block A) among the HPB data is no longer valid. Thereafter, the memory system 110 may transmit to the host 102 another map data entry regarding another area to be used instead of old map data entries (HPB entry regarding memory block A), which are no longer valid.

Figure 10:
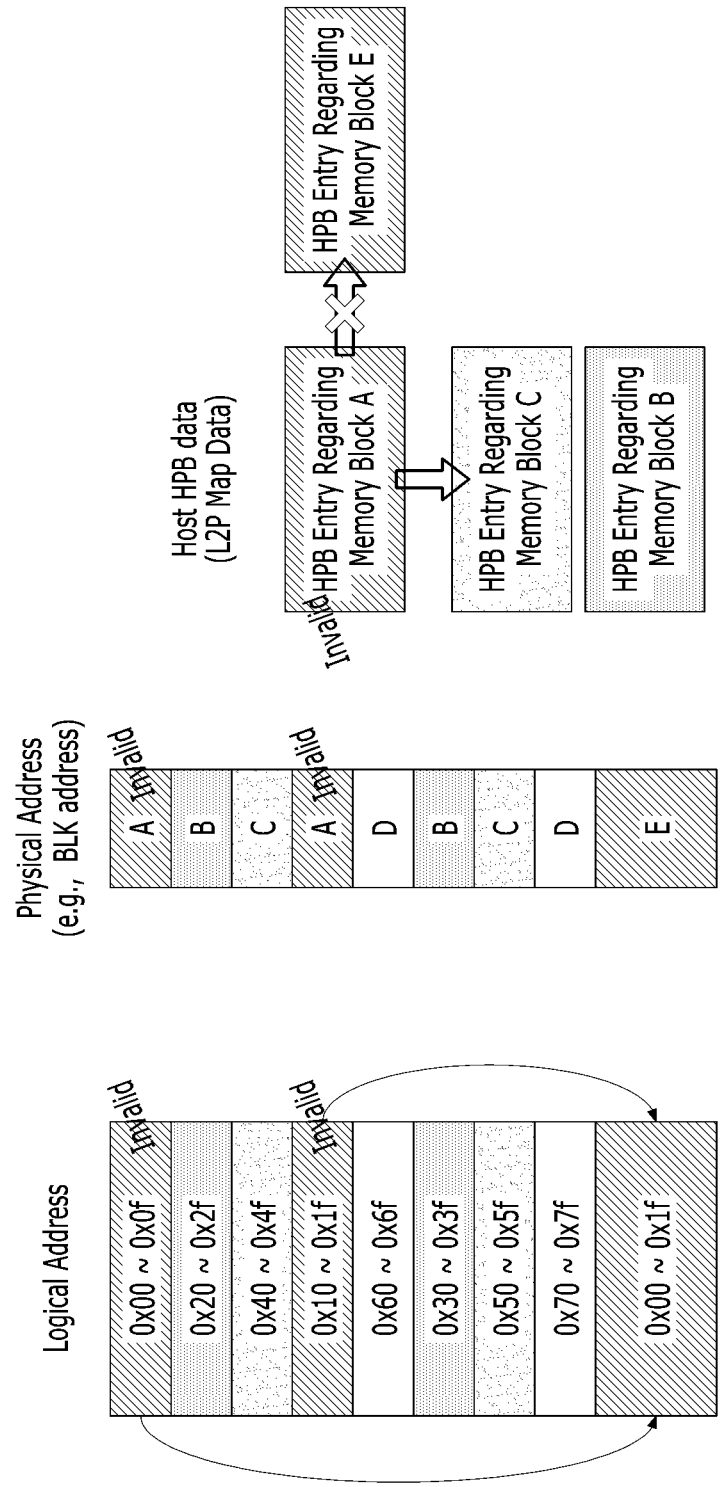
FIG. 10 illustrates an update of the HPB region.

FIG. 10 describes an update of the HPB region.

Referring to FIGS. 9 and 10, the memory system 110 may transmit, to the host 102, map data entries regarding data entries stored in a partial area (e.g., HPB region). While the memory system 110 performs the FBO operation, some data entries belonging to the HPB region may be migrated to a new location. For example, map data entries regarding data entries stored in a memory block A set as the HPB region are transmitted to the host 102 and stored in the host memory 106 (HPB entry regarding memory block A). Then, the data entries stored in the memory block A are migrated or moved to another memory block E through an FBO operation. After the memory system 110 updates the map data entries for the data entries moved through the FBO operation, the previous map data entries regarding the data entries stored in the memory block A, which has been transmitted to the host 102 after being set as the HPB region (HPB entry regarding memory block A) would be no longer valid.

The memory system 110 can transmit map data entries regarding data entries for another area when at least some of the map data entries transmitted to the host 102 are no longer valid. This is because data input/output performance can be improved by making the most use of resources allocated for the memory system 110 by the host 102. Because data entries related to map data entries transmitted to the host 102 prior to the FBO operation has been migrated to another memory block E, the memory system 110 might set the memory block E as the HPB region and transmit the updated map data entry associated with the memory block E to the host 102. However, because data entries stored in the memory block E can be obtained through sequential reading, it may be more effective to improve the data input/output speed that the memory system 110 sets as the HPB region an area (e.g., memory blocks C, D) other than the memory block E. For example, the memory system 110 might not transmit map data entries for the memory block E (HPB entry regarding memory block E) to the host 102, but can transmit map data entries for a memory block C (HPB entry regarding memory block C) to the host 102. Through the above-described operation, the memory system 110 can skip address translation with respect to data entries stored in the two memory blocks B and C in the memory system 110, because the host 102 can perform address translation based on the HPB data. In addition, data entries stored in other memory blocks E in the memory system 110 may be output quickly through sequential reading. Accordingly, more data entries can be quickly output in response to a read request input from the host 102.

Figure 11:
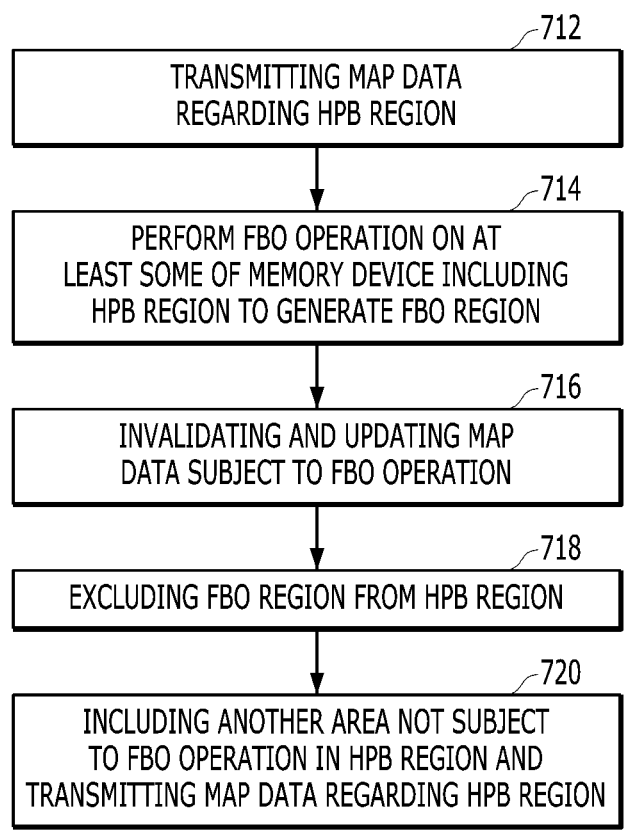
FIG. 11 illustrates a method for operating a memory system according to another embodiment of the disclosure.

FIG. 11 illustrates a method for operating a memory system according to another embodiment of the disclosure.

Referring to FIG. 11, a method for operating a memory system can include transmitting a map data entry for a host performance booster (HPB) region to a host (operation 712). A memory system 110 can transmit the map data entry to a host 102. Based on the map data entry stored in a storage space allocated for the memory system 110 by the host 102, the host 102 can transmit both a logical address and a physical address to the memory system 110.

The method for operating the memory system may include performing a file-based optimization (FBO) operation in a memory device including at least some of the HPB region (operation 714). The memory system 110 may read and output data entries faster through sequential reading than random reading. According to an embodiment, based on a request from the host 102 or a data input/output pattern tracked and monitored by the memory system 110, at least some data entries stored in a memory device 150 can be sorted and stored in an order of logical addresses so that a FBO region can be generated. When a read request transmitted from the host 102 is for the FBO region in which data entries are sorted in the order of logical addresses, the memory system 110 can sequentially read the data entries stored in the FBO region to output the data entries.

For performing the FBO operation, the memory system 110 may check whether there is an empty area in the memory device 150 in which data entries corresponding to a specific logical address range may be copied or migrated.

According to an embodiment, the operation 714 of performing the FBO operation may include receiving a specific logical address range and a FBO request input from the host 102, contiguously allocating storage areas such as memory cells, pages, or blocks included in the memory device 150 for the FBO region in which data entries corresponding to a specific logical address range can be read sequentially in response to a read request input from the host 102, and migrating the data entries corresponding to the specific logical address range to the FBO region in which plural storage areas are contiguously allocated.

According to an embodiment, the operation 714 of performing the FBO operation may include determining a specific logical address based on an access pattern to the memory device 150 in an idle state without any request input from the host 102, contiguously allocating storage areas such as memory cells, pages, or blocks included in the memory device 150 for the FBO region in which data entries corresponding to a specific logical address range can be read sequentially in response to a read request input from the host 102, and migrating the data entries corresponding to the specific logical address range to the FBO region in which plural storage areas are contiguously allocated.

The method for operating the memory system may include excluding an area (i.e., the FBO region) in which the FBO operation has been performed from the HPB region (operation 718). As described with reference to FIG. 10, because the memory system 110 can sequentially read data entries stored in the FBO region, another area other than the FBO region can be added to, or included in, the HPB region. As the HPB region and the FBO region do not overlap with each other, more data entries stored in the memory device 150 can be output quickly so that data input/output performance of the memory system 110 may be improved.

The method for operating the memory system may include invalidating map data items regarding at least some of the HPB region in which the FBO operation has been performed (operation 716). After the memory system 110 performs the FBO operation, the location of data entries may be changed due to the FBO operation. Previous map data entries of the corresponding migrated data entries would be no longer valid. In the memory system 110, when data entries included in the HPB region is moved to a new location, at least some of the HPB data (map data) transmitted to the host 102 may be no longer valid. The memory system 110 may notify the host 102 of the at least some HPB data that is no longer valid. Based on a notification, the host 102 might not use the at least some of HPB data that is no longer valid (i.e., might not perform address translation for a logical address the at least some of HPB data).

The method for operating the memory system may include adding an area where the FBO operation is not performed to the HPB region and transmitting map data items corresponding to the added area to a host (operation 720). When some of the HPB data stored in the area allocated by the host 102 is no longer valid, the memory system 110 may transfer another HPB data to the host 102 so as to improve data input/output performance. Referring to FIG. 10, the memory system 110 can transmit to the host 102 map data entries regarding another area in the memory device 150, other than the FBO region in which data entries are sorted or arranged in an order of logical addresses due to the FBO operation and obtained through sequential reading. Accordingly, more data entries stored in the memory device 150 may belong to either the HPB region or the FBO region so that input/output performance of the memory system 110 is improved.

As above-described, a memory system can improve data input/output performance based on both a host performance booster (HPB) and a file-based optimization (FBO). Further, the memory system can improve usage efficiency regarding resources which are allocated for, or used by, the memory system to support operations for the host performance booster (HPB).

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with an embodiment, the logic recited in the claims may correspond to any one or combination of the features described herein that perform the recited operations of the logic. Further, in accordance with an embodiment, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof. Furthermore, the embodiments may be combined to form additional embodiments.

The methods, processes, and/or operations described herein may be performed by code or instructions to be executed by a computer, one or more processors, one or more controllers, or other signal processing device(s). The computer, processor(s), controller(s), or other signal processing device(s) may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor(s), controller(s), or other signal processing device(s) which is to execute the code or instructions for performing the method embodiments or operations of the apparatus embodiments herein.

The controllers, processors, control circuitry, circuits, devices, modules, units, data compressors, multiplexers, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, circuits, devices, data compressors, modules, units, multiplexers, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, circuits, devices, modules, units, multiplexers, logic, interfaces, data compressors, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

What is claimed is:

1. A memory system, comprising:
 a memory device including a plurality of memory cells; and
 a controller configured to:
 identify first map data associated with first data stored in a first region of the memory device that includes some of the plurality of memory cells;
 determine second map data among the first map data, the second map data associated with second data, which is sequentially readable data among the first data; and
 transmit map data, excluding the second map data from the first map data, to an external device.

2. The memory system according to claim 1, wherein the controller is further configured to add a third region into the first region, and to transmit third map data, which is associated with third data stored in the third region, to the external device.

3. The memory system according to claim 1, wherein a logical address range regarding map data transmitted by the controller is determined based on a file system used by the external device.

4. The memory system according to claim 1, wherein the controller is configured to, in response to a request input from the external device, migrate some of the first data in the first region to a contiguously allocated location in another region.

5. The memory system according to claim 4, wherein the controller is configured to invalidate previously transmitted map data associated with the some of the first data migrated to the contiguously allocated location.

6. The memory system according to claim 1, wherein the controller is further configured to determine a first logical address range based on an access pattern regarding the memory device in an idle state when there is no request input from the external device, to establish a contiguously allocated location corresponding to memory cells storing data associated with the first logical address range, and to migrate the data to the contiguously allocated location in the memory device.

7. The memory system according to claim 6, wherein the controller is further configured to sort the data associated with the first logical address range for sequential read operations during garbage collection while performing a garbage collection operation for the memory device.

8. The memory system according to claim 7, wherein the controller is further configured to transmit, to the external device, a notice indicating that previously transmitted map data associated with the first logical address range become invalid, after sorting the data for the sequential read operation.

9. The memory system according to claim 1, wherein the controller is configured to determine the first region based on a size of the map data transmitted to the external device.

10. A method for operating a memory system including a memory device, the memory device including memory blocks including a plurality of memory cells, the method comprising:
 identifying first map data associated with first data stored in a host performance booster (HPB) region including some of the plurality of memory cells;
 determining second map data among the first map data, the second map data associated with second data which is sequentially readable data among the first data stored in the HPB region; and
 transmitting map data, excluding the second map data from the first map data, to a host.

11. The method according to claim 10, further comprising:
 performing a file-based optimization (FBO) operation for at least some of the HPB region in the memory device; and
 invalidating some of the first map data corresponding to the at least some of the HPB region.

12. The method according to claim 10, further comprising:
 adding a region irrelevant to a file-based optimization (FBO) operation to the HPB region; and
 transmitting at least one map data corresponding to an added region to the host.

13. The method according to claim 10, wherein a file-based optimization (FBO) operation is performed for a first logical address range determined based on a file system used by the host.

14. The method according to claim 13, wherein the performing the FBO operation comprises:
   establishing, in response to a request input from the host, a file-based optimization (FBO) region including memory cells contiguously allocated for storing data associated with the first logical address range; and
   migrating the data associated with the first logical address range to the FBO region.

15. The method according to claim 13, wherein the performing the FBO operation comprises:
   determining the first logical address range based on an access regarding the memory device in an idle state when there is no request input from the host;
   establishing a file-based optimization (FBO) region including memory cells contiguously allocated for storing data associated with the first logical address range; and
   migrating the data associated with the first logical address range to the FBO region.

16. The method according to claim 13, further comprising:
   checking a blank region capable of storing data associated with the first logical address range.

17. The method according to claim 11, further comprising:
   performing the FBO operation along with garbage collection for the memory device.

18. A controller coupled to a memory including a plurality of regions, each region including a plurality of memory cells, the controller including at least one processor, at least one memory, and logic in which at least a portion of the logic is comprised in hardware and executed by the at least one processor to:
   program data input from an external device in a first region among the plurality of regions;
   migrate the data from the first region to either a second region or a third region from among the plurality of regions based on an attribute of the data, the second region allocated for a random read operation, the third region allocated for a sequential read operation;
   transmitting map data associated with the data stored in the second region, not the third region, to the external device;
   performing the random read operation for the data stored in the second region, in response to a first read request along with an address of the second region, which is input from the external device; and
   performing the sequential read operation for the data stored in the third region, in response to a second read request input from the external device.

19. The controller according to claim 18, wherein the first region includes a single-level cell (SLC) buffer, while the second region and the third region individually include a multi-level cell (MLC) block.

20. The controller according to claim 18, wherein the logic is configured to perform data migration for data from the first region to the third region, and the data are determined based on a file system used by the external device.

* * * * *